United States Patent
Gatti

(10) Patent No.: US 11,080,857 B2
(45) Date of Patent: Aug. 3, 2021

(54) SYSTEMS AND METHODS FOR SEGMENTING AN IMAGE

(71) Applicant: NeuralSeg Ltd., Hamilton (CA)

(72) Inventor: Anthony Gatti, Hamilton (CA)

(73) Assignee: NeuralSeg Ltd., Hamilton (CA)

( * ) Notice: Subject to any disclaimer, the term of this patent is extended or adjusted under 35 U.S.C. 154(b) by 113 days.

(21) Appl. No.: 16/394,240

(22) Filed: Apr. 25, 2019

(65) Prior Publication Data
US 2019/0333222 A1 Oct. 31, 2019

Related U.S. Application Data

(60) Provisional application No. 62/662,898, filed on Apr. 26, 2018.

(51) Int. Cl.
*G06K 9/00* (2006.01)
*G06T 7/11* (2017.01)
(Continued)

(52) U.S. Cl.
CPC .............. *G06T 7/11* (2017.01); *G06K 9/6277* (2013.01); *G06T 7/0012* (2013.01); *G06T 7/143* (2017.01);
(Continued)

(58) Field of Classification Search
CPC ............ G06T 7/0012; G06T 7/11; G06T 2207/10088; G06T 2207/20081;
(Continued)

(56) References Cited

U.S. PATENT DOCUMENTS

| | | | |
|---|---|---|---|
| 2011/0019889 A1* | 1/2011 | Gering | G06T 7/12 382/131 |
| 2014/0198979 A1* | 7/2014 | Hamarneh | G06T 7/11 382/154 |

(Continued)

OTHER PUBLICATIONS

Yu et al., "Volumetric ConvNets with Mixed Residual Connections for Automated Prostate Segmentation from 3D MR Images". Association for the Advancement of Artificial Intelligence, Feb. 2017, retrieved from http://appsrv.cse.cuhk.edu.hk/~lqyu/papers/AAAI17_Prostate.pdf.

(Continued)

*Primary Examiner* — Guillermo M Rivera-Martinez
(74) *Attorney, Agent, or Firm* — Own Innovation; James W. Hinton

(57) ABSTRACT

Methods and systems for segmenting a medical image into classes are described. A system to segment a medical image includes a processor and memory with instructions that upon execution cause the system to perform a method for segmenting the image. The method includes using initial segmentation methods to derive at least one set of probabilities of belonging to the classes for each pixel of the image. The at least one set of probabilities and the image are input into a neural network which segments the image based on both the probabilities and the image provided. This system can also use patches or sub-sections of the original image and the at least one set of probabilities as inputs to the final neural network. The patch based method enables segmentation of larger images, which usually require large amounts of time and memory to segment, and can produce a highly trained neural network.

20 Claims, 15 Drawing Sheets

300

Derive at least one set of probabilities of belonging to m classes for each pixel of an image using at least one segmentation method. — 301

Input the image into a first neural network. — 302

Input the at least one set of probabilities into the first neural network. — 303

Segment the image into the m classes based on the image and the at least one set of probabilities by the first neural network. — 304

(51) Int. Cl.
  *G06K 9/62* (2006.01)
  *G06T 7/00* (2017.01)
  *G06T 7/143* (2017.01)
(52) U.S. Cl.
  CPC .............. *G06T 2207/20081* (2013.01); *G06T 2207/20128* (2013.01)
(58) Field of Classification Search
  CPC . G06T 2207/20084; G06T 2207/10081; G06T 2207/10132; G06T 2207/30004; G06T 2207/10072; G06T 2207/10116; G06T 2210/41; G06T 2207/20076; G06T 2207/10104; G06T 7/143; G06T 7/10; G06T 2211/424; G06T 7/00; G06K 9/6292; G06K 2209/051; G06K 9/628; G06K 9/46; G06K 9/6267; G06K 9/0014
  See application file for complete search history.

(56) References Cited

U.S. PATENT DOCUMENTS

| | | | | |
|---|---|---|---|---|
| 2018/0260989 | A1* | 9/2018 | Shen | G06F 3/0487 |
| 2019/0080456 | A1* | 3/2019 | Song | G06T 7/12 |
| 2019/0205606 | A1* | 7/2019 | Zhou | G06N 3/0445 |
| 2019/0295260 | A1* | 9/2019 | Mehta | G06K 9/4628 |
| 2019/0304098 | A1* | 10/2019 | Chen | G06K 9/4628 |
| 2020/0003857 | A1* | 1/2020 | Weese | G01R 33/58 |
| 2020/0167928 | A1* | 5/2020 | Heindl | A61B 6/502 |
| 2020/0167930 | A1* | 5/2020 | Wang | G06T 7/0012 |

OTHER PUBLICATIONS

Ahn et al., "Fully automated, level set-based segmentation for knee MRIs using an adaptive force function and template: data from the osteoarthritis initiative", BioMedical Engineering OnLine, 15(1), Jul. 2016.

Carballido-Gamio et al., "Combined image processing techniques for characterization of MRI cartilage of the knee", 2005 IEEE Engineering in Medicine and Biology 27th Annual Conference, Jan. 2006, pp. 3043-3046.

Duryea et al., "Novel fast semi-automated software to segment cartilage for knee MR acquisitions", Osteoarthritis and Cartilage, Nov. 2006, pp. 487-492, 15(5).

Folkesson et al., "Automatic segmentation of the articular cartilage in knee MRI using a hierarchical multi-class classification scheme", Medical Image Computing and Computer-Assisted Intervention—MICCAI 2005, Oct. 2005, pp. 327-334.

Folkesson et al., "Segmenting Articular Cartilage Automatically Using a Voxel Classification Approach", IEEE Transactions on Medical Imaging, Jan. 2007, pp. 106-115, 26(1).

Milletari et al., "Fully Convolutional Neural Networks for Volumetric Medical Image Segmentation", Jun. 15, 2016, retrieved from https://arxiv.org/abs/1606.04797v1.

Norman et al., "Use of 2D U-Net Convolutional Neural Networks for Automated Cartilage and Meniscus Segmentation of Knee MR Imaging Data to Determine Relaxometry and Morphometry." Radiology, 172322, Mar. 27, 2018, vol. 288, No. 1.

Ronneberger et al., "U-net: Convolutional networks for biomedical image segmentation", International Conference on Medical Image Computing and Computer-Assisted Intervention, Nov. 18, 2015, pp. 234-241.

Shim et al., "Knee Cartilage: Efficient and Reproducible Segmentation on High-Spatial-Resolution MR Images with the Semiautomated Graph-Cut Algorithm Method", Radiology, May 2009, pp. 548-556, 251(2).

Tamez-Pena et al., "Unsupervised Segmentation and Quantification of Anatomical Knee Features: Data From the Osteoarthritis Initiative", IEEE Transactions on Biomedical Engineering, Feb. 3, 2012, pp. 1177-1186, 59(4).

* cited by examiner

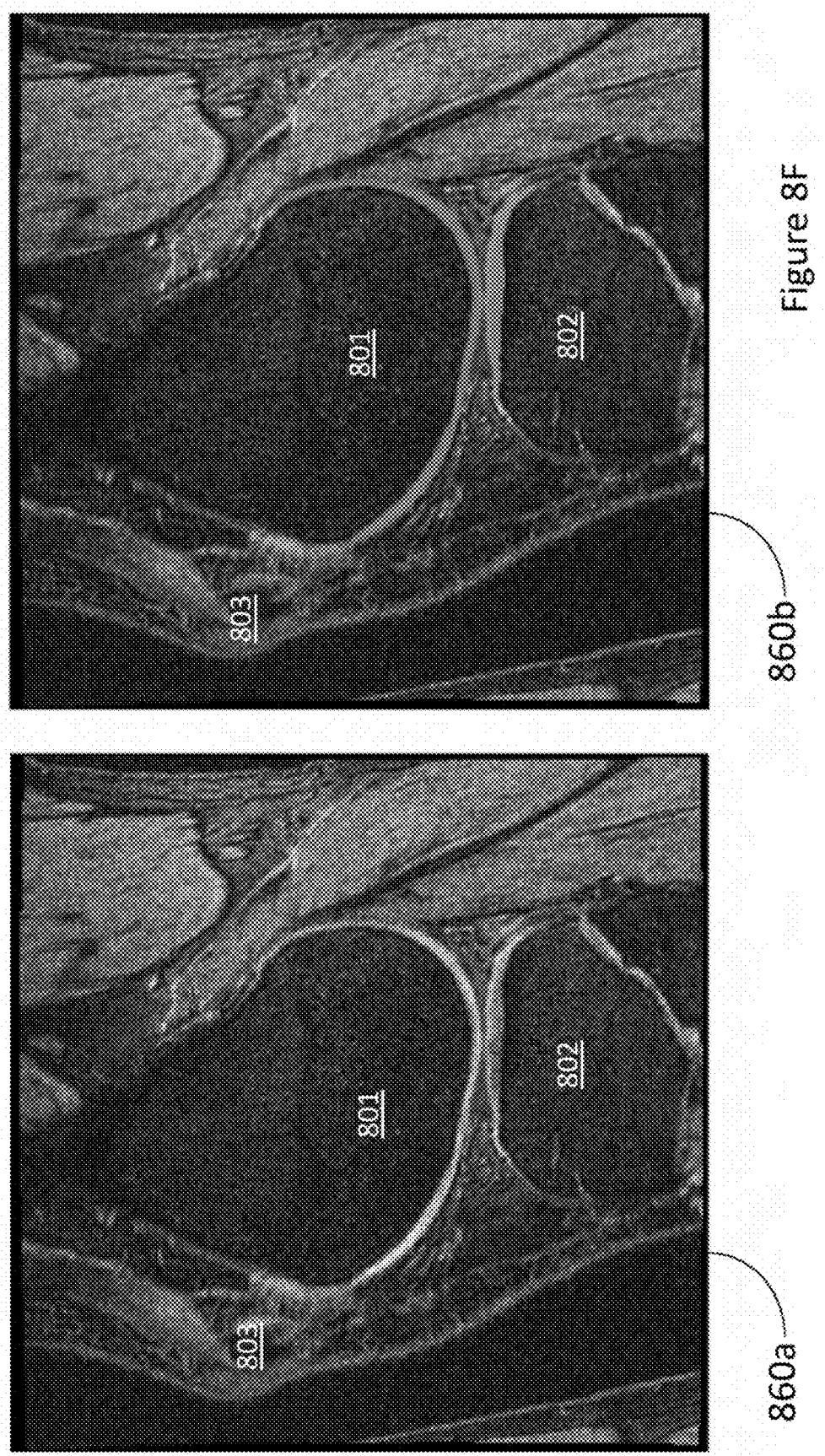

SYSTEMS AND METHODS FOR SEGMENTING AN IMAGE

TECHNICAL FIELD

The embodiments disclosed herein relate to image segmentation, and, in particular to systems and methods for segmenting images.

INTRODUCTION

Segmentation is the process of identifying regions of interest within an image. Examples of image segmentation are identification of roads, people, stop signs, and other objects in images taken from self-driving vehicles, or identifying the location of anatomical structures in medical images. Segmentation assigns each pixel of an image with a unique label that corresponds to an object of interest. There may be m classes in an image, with m being the number of objects or regions of interest in the image.

Image segmentation may be performed as a manual, semi-automated, or automated process. A fully manual image segmentation process would include a human identifying the correct label for each pixel in an image. A semi-automated method would include at least some human input such as identifying seed points within objects of interest that can then be inputted into an automated process. A fully automated process requires no human input (beyond creating the automated process) and includes methods such as machine learning.

Current methods of segmentation may have challenges. Manual or semi-automated methods are prone to human error or bias. Semi-automated or fully automated methods are limited by the specifications of the computer hardware, such as the available memory for the GPU. Often the image is too large to be segmented using the available memory. Automated methods also require large amounts of data to be trained to provide robust outcomes. And all methods may require exorbitant amounts of time and physical resources to create satisfactory results.

Accordingly, there is a need for a segmentation method which strikes a balance of achieving precise and useful results but not being prohibitively time-consuming or having impractical computing and data requirements. The systems and methods described herein may address one or more of these issues, particularly as they apply to medical images.

SUMMARY

According to some embodiments, there is a computer system for segmenting a medical image comprising at least one processor and a memory having stored thereon instructions that, upon execution, cause the system to perform functions comprising: inputting the medical image into at least a first segmentation method, deriving at least one set of probabilities of belonging to at least one tissue class for each pixel of a medical image using the at least a first segmentation method, inputting the medical image into a final neural network, inputting the at least one set of probabilities into the final neural network, and segmenting the medical image into the at least one tissue class based on the medical image and the at least one set of probabilities by the final neural network.

The segmentation method used by the system may include at least one of an initial neural network, a machine learning classifier, or an atlas based segmentation algorithm.

The medical image may be input into the at least a first segmentation method and the final neural network as sub-sections of the medical image and the method may further comprise: deriving at least one set of probabilities for each sub-section of the medical image, and combining the probabilities from the sub-sections. The outputted predictions of the final neural network are the probabilities that each pixel belongs to each of the m classes, and the predictions from overlapping or non-overlapping patch predictions are combined to produce a full-size segmentation.

The functions may further comprise pre-processing the medical image.

The at least one set of probabilities may be derived from a lower resolution iteration of the medical image. In some cases, the original image may be downsampled or made to have a lower resolution before the at least one set of probabilities is derived by the segmentation method where the original image is still used as the input for the final neural network. In some cases, the original image may be pre-processed before the at least one set of probabilities is derived by the at least one segmentation method. The pre-processing may include normalization of the image. According to some embodiments, there is a method of automatically segmenting an image that utilizes a final neural network trained using inputs of original image data and probabilities that each pixel belongs to each of m classes. The probability inputs of this final neural network are outputted from a prior step, these probabilities can be produced using various segmentation methods including a first neural network trained to do so, or some other algorithm that segments images such as an atlas-based or machine-learning based algorithm. The output of the network is the probabilities that each pixel belongs to each of the m classes. These probabilities can then be used to create a final segmentation of the image. Not only may different segmentation methods be used to obtain the probabilities inputted into the final neural network, multiple steps may also be employed, e.g., segmenting the original image using a first neural network, cropping out the region of interest from the original image and then segmenting this smaller representation and providing the probabilities from this smaller representation as inputs into the final neural network. It is also possible that multiple sets of probabilities from multiple sources (different neural networks, different image cropping sizes, different segmentation methods—e.g., atlas-based algorithms) may be used as inputs into the final neural network.

The at least one set of probabilities may be derived from at least two iterations of the medical image. In some cases, there are multiple additional steps between the output of the first segmentation method and the input into the final neural network, including but not limited to cropping the image and segmenting the cropped image using a first neural network or other segmentation algorithm trained for the task and inputting the probabilities produced by this segmentation algorithm along with the original pixel data as input into the final neural network (as above), the cropping and segmenting may be performed iteratively before probabilities are inputted into the final neural network, and sets of probabilities outputted from multiple stages of segmentation may all be used as inputs into the final network as described above.

According to some embodiments, there is a method of segmenting an image, the method comprising: deriving at least one set of probabilities of belonging to m classes, where m is any positive integer, for each pixel of an image using at least one segmentation method, inputting the image into a final neural network, inputting the at least one set of probabilities into the final neural network, and segmenting the image into the m classes based on the image and the at least one set of probabilities by the final neural network.

The at least a first segmentation method may include at least one method of an initial neural network, a machine learning classifier, or an atlas based segmentation algorithm.

The image may be input into the at least a first segmentation method and the final neural network as sub-sections of the image, the method may further comprise: deriving at least one set of probabilities for each sub-section of the image, and combining the probabilities from the sub-sections.

The method may further comprise pre-processing the image.

The medical image may be a magnetic resonance imaging image, computed tomography (CT) image, ultrasound image, x-ray image, or pathology image from microscope.

The at least one set of probabilities may be derived from a lower resolution iteration of the image. The at least one set of probabilities may be derived from at least two iterations of the image.

According to another embodiments, there is a system for segmenting an image comprising at least one processor and a memory having stored thereon instructions that, upon execution, cause the system to perform functions that may include: deriving at least one set of probabilities of belonging to m classes, where m is any integer, for each pixel of an image using at least a first segmentation method, inputting the image into a final neural network, inputting the at least one set of probabilities into the final neural network, and segmenting the image into the m classes based on the image and the at least one set of probabilities by the final neural network.

The at least a first segmentation method may include at least one method of an initial neural network, a machine learning classifier, or an atlas based segmentation algorithm.

The image may be input into the at least a first segmentation method and the final neural network as sub-sections of the image wherein the functions may further include: deriving at least one set of probabilities for each sub-section of the image, and combining the probabilities from the sub-sections.

The functions may further comprise pre-processing the image.

The at least one set of probabilities may be derived from a lower resolution iteration of the image. The at least one set of probabilities may be derived from at least two iterations of the image.

All of the method embodiments described above and below may occur in system embodiments as well and vice versa.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification.

FIG. 8F is an image of a segmented knee MRI image, in accordance with an embodiment.

DETAILED DESCRIPTION

Figure 1:
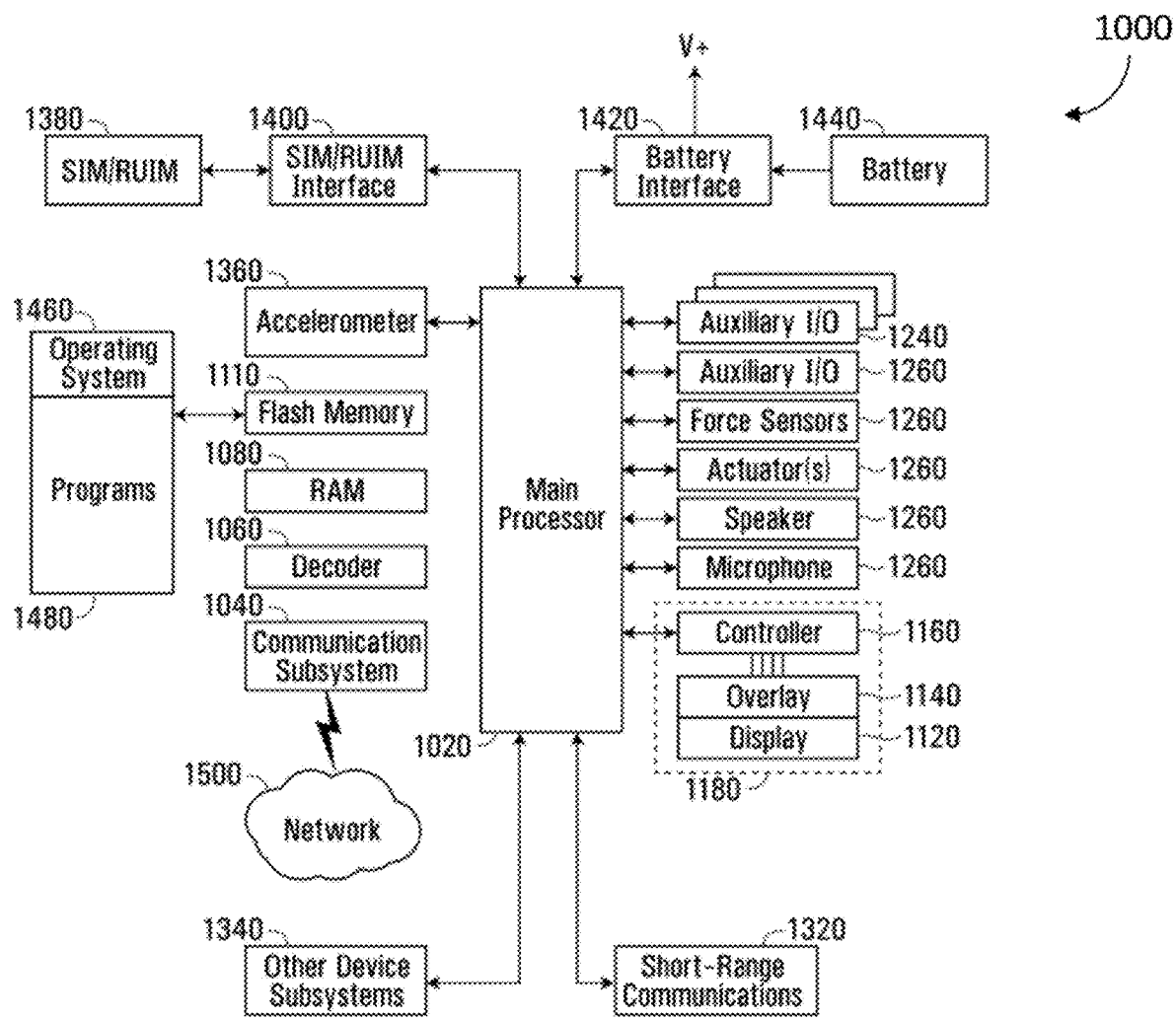
FIG. 1 is a block diagram of a computer system for segmenting an image, in accordance with an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud based program or system, laptop, personal data assistance, cellular telephone, smartphone, or tablet device.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

Segmentation is the process of identifying regions of interest within an image. Examples of image segmentation are identification of roads, people, stop signs, and other objects in images taken from self-driving vehicles, or identifying the location of anatomical structures in medical images. Segmentation assigns each pixel of an image with a unique label that corresponds to an object of interest. There may be m classes in an image, with m being the number of objects of interest in the image.

Image segmentation may be performed as a manual, semi-automated, or automated process. A fully manual image segmentation process would include a human identifying the correct label for each pixel in an image—even this is typically aided by computer software, i.e., manual segmentation may be done using computer software similar to Microsoft paint, where the user essentially colors the image to identify what label each pixel belongs to. Depending on the image size, manual analysis can be very time consuming. Taking the example of three-dimensional (3D) medical images, a knee magnetic resonance imaging (MRI) image may contain hundreds of slices. When manually delineating each slice takes just a few minutes (3-min), and the image contains 100 slices, uninterrupted analysis time will be 5 hours.

Semi-automated methods require at least some human input for segmentation. Research using semi-automated segmentation methods typically require a user to identify seed points within the object(s) of interest. These seeds are inputted into an optimization algorithm, or other step-by-step image processing technique. After an initial segmentation, many of these semi-automated methods require iterative editing until a desired segmentation is produced. Semi-automated methods still require extensive human intervention. The method by Duryea and colleagues reported an average analysis time of >75 minutes per image-set, while the method by Shim and colleagues required analysis time of >50 minutes per image-set. Furthermore, the results of these semi-automated methods are still biased to the individual performing the analysis, and therefore prone to human error.

Fully automated segmentation methods have historically included machine learning, or neural networks. The machine learning methods typically create hand-crafted "features" like gradients of the image, pixel locations, and pixel intensity to train a classifier such as k-nearest neighbors, or support vector machine to identify each pixel as belonging to one of the m classes. This method is able to produce results faster than the semi-automated methods (reported 10-minutes per image), however accuracy is limited. One example of an atlas-based segmentation method is registration (alignment), of previously segmented images (atlases), with the current image, followed by a voting method that uses location of labels in each of the atlases to determine where the objects of interest are located. Segmentation algorithms including such atlas-based methods have been reported as taking up to 48 hours for analysis of a single image.

Neural network segmentation methods include feeding a neural network (such as a network of propagated connections with learned weights) an image and returning an image with each pixel classified to the classes of interest. These neural networks are trained to learn the optimal connection weights to produce the result of interest. Neural networks for segmentation can have many architectures. A recently popular architecture is U-Net, which utilizes a network architecture similar to an autoencoder.

An autoencoder is a neural network structure that aims to compress an image, or other data structure, and then decompresses the data to return an output as close to the original as possible—therefore autoencoding can be thought of as a method of compression. There are two main differences between U-Net and a typical autoencoder: 1) the output of U-Net was a segmentation, created by using softmax as the activation function to the final layer of the network, and 2) U-Net connected data from the compression branch of the neural network directly to the decompression branch of the neural network, minimizing loss of contextual image data.

A neural network method of segmentation may have certain benefits, including: 1) while it takes extensive time and computational power to train the neural network, once the network is trained it is relatively fast to implement, primarily comprising of matrix multiplication which can be efficiently performed on a graphics processing unit (GPU). 2) These networks have the potential to learn from massive amounts of data, effectively learning the average of all given examples. In theory, a neural network approach could outperform the original ground truth examples, typically produced by humans, by learning the average of all examples.

A major limitation of the neural network methods for medical image segmentation is the sheer size of medical images, and the computer hardware needed to train these networks. Most neural network implementations are trained on GPUs, and the size of the network is limited based on the memory available to the GPU. Currently, the largest GPU memory available on a single card is 16 GB. To use the U-Net style segmentation algorithm on a graphics card with 12 GB of memory, Milletari and colleagues (2016) downsampled 3D medical images into a shape of 128×128×64. For knee MRIs, the MRI size is typically much larger; for example, Tamez-Pena and colleagues had images of size 384×384×160. To fit a knee MRI into the network created by Milletari and colleagues, it would be necessary to downsample the images by a factor of 22.5 (384/128*384/128*160/64=22.5). Downsampling necessary to fit these images into the neural network comes at the expense of losing high resolution image data, and pixelated results. It is also possible that during downsampling thin structures like cartilage in a knee MRI may be lost entirely. To alleviate this problem, a neural network implementation by Norman and colleagues (2018) segmented each individual slice of their MRI images, and then combined these slices to produce the resulting segmentation. However, this method of segmenting individual slices has the potential to lose context between adjacent image slices. Similar to segmenting each individual slice of the image, the full medical image can be broken into smaller 3D sections which are individually segmented and then combined. Again, this method suffers from losing global context of the pixel data.

The presented disclosure provides a method of automatically segmenting an image that utilizes a final neural network trained using inputs of original image data and probabilities that each pixel belongs to each of m classes. The probability inputs of this final neural network are outputted from a prior step, these probabilities can be produced using various segmentation methods including at least a first neural network trained to do so, or some other algorithm that segments images such as an atlas-based or machine-learning based algorithm. The output of the final network is the probabilities that each pixel belongs to each of the m classes. These probabilities can then be used to create a final segmentation of the image.

The benefits of the disclosed systems and methods are many. The two-step process of localizing pixels for each class by the initial segmentation method and then refining the segmentation by the final neural network can segment much larger full resolution images that couldn't be segmented by currently available methods. As well, using patches or subsections of an image enables for more training of the final neural network because there is a much larger sample size than when using a single image.

FIG. 1 shows a simplified block diagram of components of a device 1000, such as a computer system, a mobile device or portable electronic device. The device 1000 includes multiple components such as a processor 1020 that controls the operations of the device 1000. Communication functions, including data communications, voice communications, or both may be performed through a communication subsystem 1040. Data received by the device 1000 may be decompressed and decrypted by a decoder 1060. The communication subsystem 1040 may receive messages from and send messages to a wireless network 1500.

The wireless network 1500 may be any type of wireless network, including, but not limited to, data-centric wireless networks, voice-centric wireless networks, and dual-mode networks that support both voice and data communications.

The device 1000 may be a battery-powered device and as shown includes a battery interface 1420 for receiving one or more rechargeable batteries 1440.

The processor 1020 also interacts with additional subsystems such as a Random Access Memory (RAM) 1080, a flash memory 1100, a display 1120 (e.g. with a touch-sensitive overlay 1140 connected to an electronic controller 1160 that together comprise a touch-sensitive display 1180), an actuator assembly 1200, one or more optional force sensors 1220, an auxiliary input/output (I/O) subsystem 1240, a data port 1260, a speaker 1280, a microphone 1300, short-range communications systems 1320 and other device subsystems 1340.

In some embodiments, user-interaction with the graphical user interface may be performed through the touch-sensitive overlay 1140. The processor 1020 may interact with the touch-sensitive overlay 1140 via the electronic controller 1160. Information, such as text, characters, symbols, images, icons, and other items that may be displayed or rendered on a portable electronic device generated by the processor 102 may be displayed on the touch-sensitive display 118.

The processor 1020 may also interact with an accelerometer 1360 as shown in FIG. 1. The accelerometer 1360 may be utilized for detecting direction of gravitational forces or gravity-induced reaction forces.

To identify a subscriber for network access according to the present embodiment, the device 1000 may use a Subscriber Identity Module or a Removable User Identity Module (SIM/RUIM) card 1380 inserted into a SIM/RUIM interface 1400 for communication with a network (such as the wireless network 1500). Alternatively, user identification information may be programmed into the flash memory 1100 or performed using other techniques.

The device 1000 also includes an operating system 1460 and software components 1480 that are executed by the processor 1020 and which may be stored in a persistent data storage device such as the flash memory 1100. Additional applications may be loaded onto the device 1000 through the wireless network 1500, the auxiliary I/O subsystem 1240, the data port 1260, the short-range communications subsystem 1320, or any other suitable device subsystem 1340.

For example, in use, a received signal such as a text message, an e-mail message, web page download, or other data may be processed by the communication subsystem 1040 and input to the processor 1020. The processor 1020 then processes the received signal for output to the display 1120 or alternatively to the auxiliary I/O subsystem 1240. A subscriber may also compose data items, such as e-mail messages, for example, which may be transmitted over the wireless network 1500 through the communication subsystem 1040.

For voice communications, the overall operation of the portable electronic device 1000 may be similar. The speaker 1280 may output audible information converted from electrical signals, and the microphone 1300 may convert audible information into electrical signals for processing.

Figure 2:
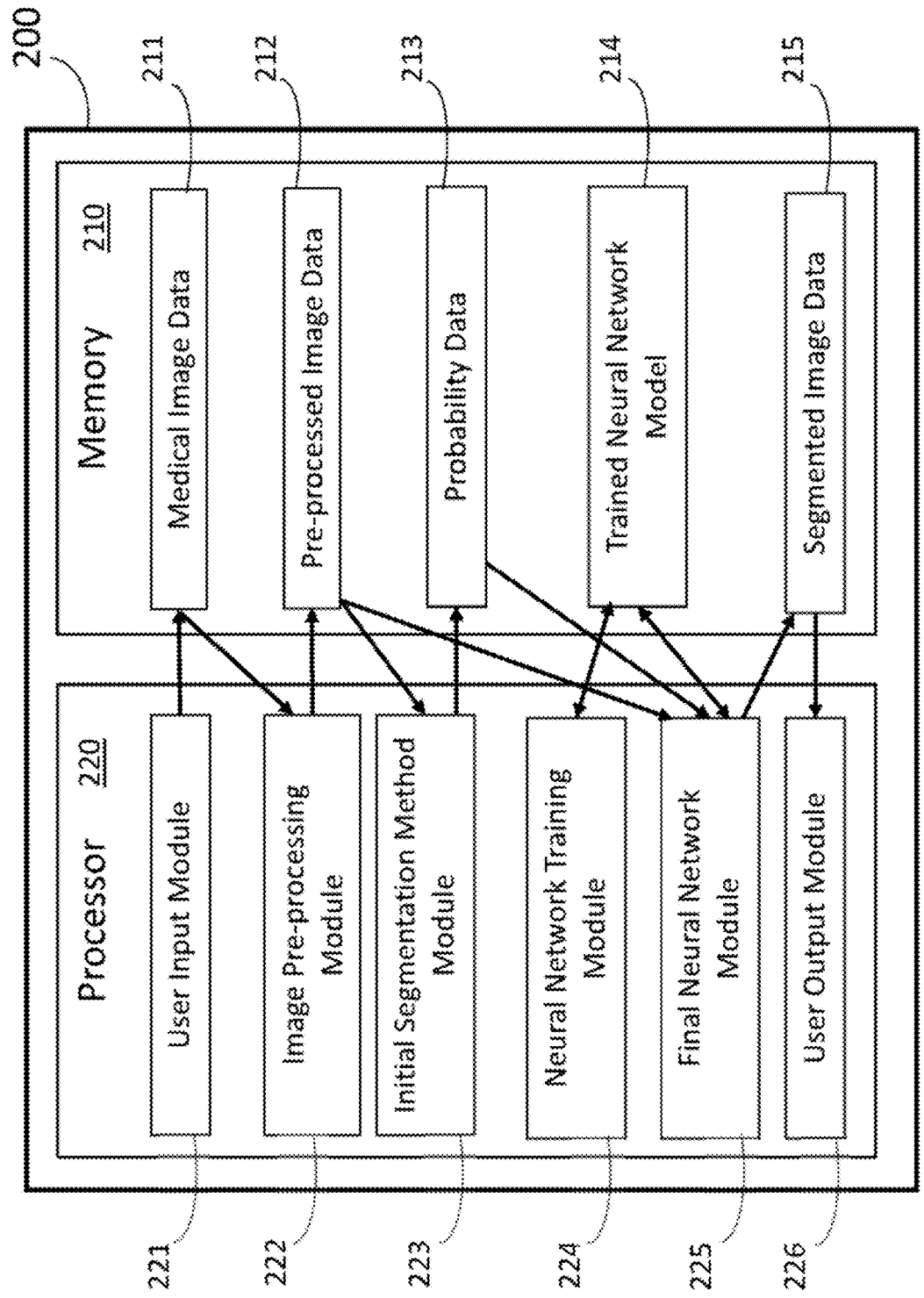
FIG. 2 is a block diagram of a processor and memory used in a computer system for segmenting an image, in accordance with an embodiment.

FIG. 2 is a block diagram of a processor 220 and memory 210 used in a computer system 200 (e.g., device 1000 of FIG. 1) for segmenting a medical image. Computer system 200 includes other components beyond processor 220 and memory 210. Memory 210 may have instructions stored thereon which upon execution cause computer system 200 to perform the functions of methods discussed herein including method 300 in FIG. 3, method 400 in FIG. 4, and method 500 in FIG. 5. Memory 210 includes medical image data 211, pre-processed image data 212, probability data 213, trained neural network model 214, and segmented image data 215. Processor 220 includes user input module 221, image pre-processing module 222, initial segmentation method module 223, neural network training module 224, final neural network module 225, and user output module 226.

User input module 221 receives medical image data 211 from the user and stores the original image data 211 in memory 210. Original image data 211 is pre-processed by image processing module 222 and the resulting pre-processed image date 212 is stored in memory 210. Pre-processing may include normalizing the image as discussed further below.

Pre-processed image data 212 is segmented into any number of classes (e.g., tissue classes) by initial segmentation method module 223. Medical image 211 may also not be pre-processed, in which case medical image data 211 would be segmented by initial segmentation method module 223.

The initial segmentation method may be a first neural network, a machine learning classifier, an atlas-based segmentation algorithm or any means by which probabilities of each pixel belonging to each tissue class can be derived. The initial segmentation method may also be more than one method and there may be more than one module dedicated to initial segmentation. Initial segmentation method module 223 stores probability data 213 in memory 210.

Medical image data 211 and/or pre-processed image data 212 and probability data 213 are segmented by final neural network module 225 which accesses trained neural network model 214 to derive probabilities of each pixel belonging to each class (e.g., tissue class).

Trained neural network model 214 may have been previously trained by example images. Images which are segmented by final neural network 225 can be used to further train trained neural network model 214. The training may be accomplished by neural network training module 224. Segmented image data 215 is stored in memory 210 by final neural network module 225. Segmented image data 215 may be accessed by the user through user output module 226.

Further modules may be present on processor 220 and further data may be stored in memory 210. FIG. 2 shows the modules and data for image segmentation as discussed herein. For example, when an image is down-sampled before the initial segmentation processor 220 includes a down-sampling module and memory 210 includes down-sampled image data.

Where the image is first divided into patches or sub-sections, the processor 220 includes a dividing module, and memory 210 includes corresponding data each sub-section. The system 200 may be used to segment images other than medical images.

Figure 3:
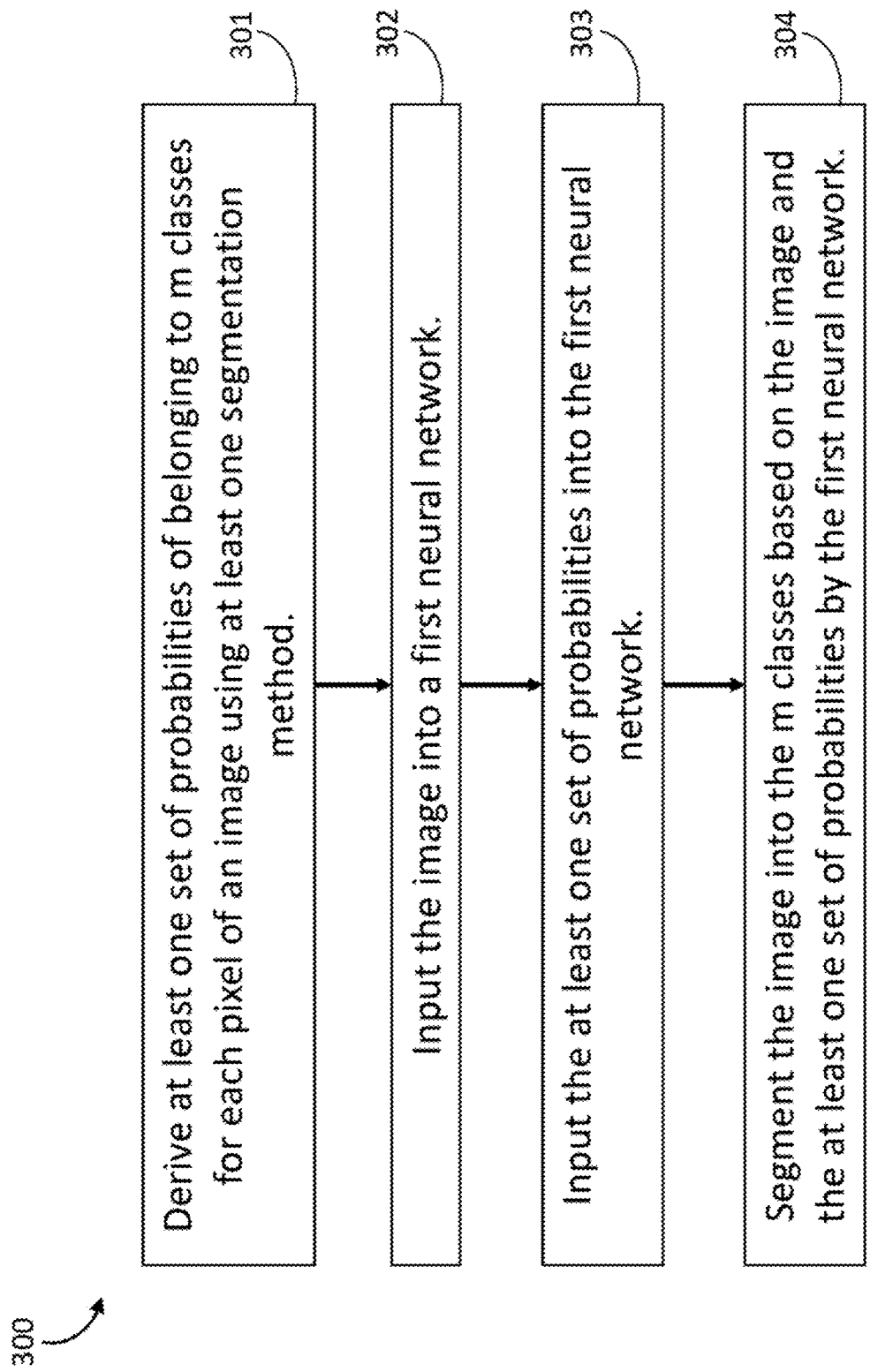
FIG. 3 is a flow chart of a method for automatic image segmentation using a final neural network, in accordance with an embodiment.

FIG. 3 is a flow chart of a method 300 for image segmentation. The method 300 may be performed by a system (discussed below) including at least one processor and a memory having stored thereon instructions that, upon execution, cause the system to perform the method 300.

At 301, at least one set of probabilities of belonging to m classes (where m in any positive integer) for each pixel of an image is derived using at least one initial segmentation method. The at least one initial segmentation method includes any one or more of a first neural network, a machine learning classifier, and/or an atlas based segmentation algorithm. More than one type of segmentation method may be used and different methods within each type may also be used.

For example, when segmenting an image of a knee MRI, different neural networks may be used. Each neural network may produce probabilities of each pixel belonging to a tissue class. The tissue classes may include any one or more of bone, cartilage, meniscus, muscle, and ligament.

A single neural network may provide probabilities for all five tissue classes, or a separate neural network may produce probabilities for different tissue classes. Different segmentation methods may be used to provide probabilities, i.e., one neural network and one atlas-based segmentation algorithm. The original image may be pre-processed, downsampled, cropped, or broken into sub-sections, before the at least one set of probabilities is derived (e.g., a discussed with reference to FIGS. 2-5).

At 302, the image is input as data into a final neural network. The original image without any cropping or down-sampling is provided to the final neural network which has been previously trained to segment the image.

At 303, the at least one set of probabilities from 301 is input into the final neural network. If the probabilities have been derived from sub-sections or multiple iterations of the original photo then any probabilities which represent the same pixel are combined. The combination may be performed by averaging the probabilities but could also include some weighting of the probabilities based on how the sub-section or iterations were created or what parts of the image they represent.

At 304, the image is segmented into m classes by the final neural network based on both the original image and on the at least one set of probabilities derived from the initial segmentation method. Additional acts and modifications of this method are discussed in more detail below.

Figure 4:
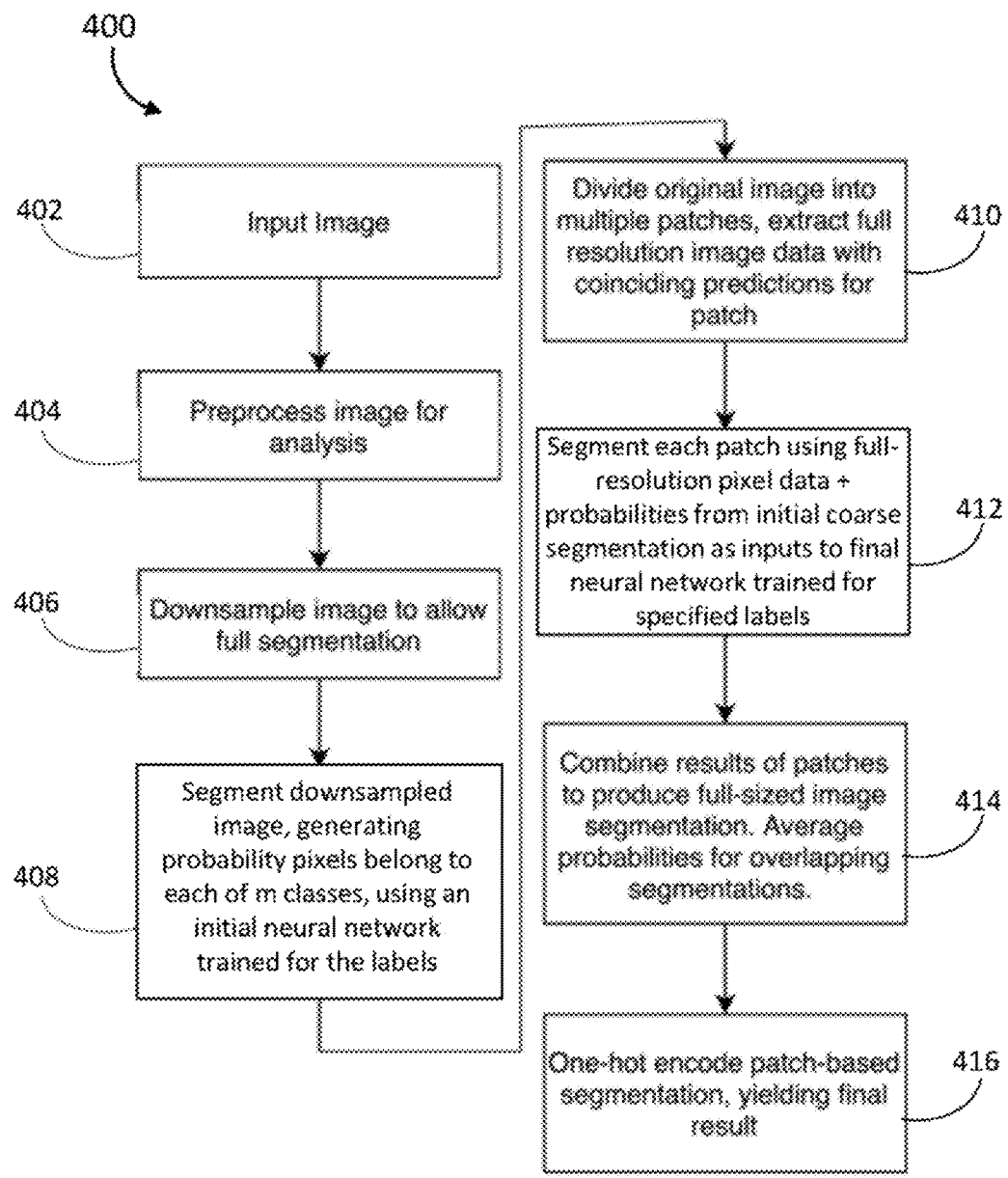
FIG. 4 is a flow chart of a method for automatic image segmentation, in accordance with an embodiment.

Turning now to FIG. 4, illustrated therein is a method 400 of segmenting an image, in accordance with an embodiment. Method 400 may be performed by a system similar to system 200. Method 400 includes producing a segmentation of an entire image by first segmenting a lower-resolution representation of the image using a first neural network trained to segment the labels of interest. The initial segmentation is a "coarse" segmentation. The output of the lower-resolution "coarse" segmentation is a probability map, including the probabilities that each pixel belongs to each of m classes, where m is a positive integer determined by the segmentation task. The probabilities from the initial segmentation are used by the final neural network to yield the final image segmentation. Method 400 includes a patch-based final segmentation discussed below.

At 402, the image is input into a system which will segment the image. The system may be similar to system 200.

At 404, the image is pre-processed for analysis. Pre-processing may include normalization of the image or other means of preparing the image to be segmented. Examples of pre-processing are discussed below.

At 406, the image is downsampled. Downsampling is a process by which an image is downscaled to decrease the size of the image. A lower resolution image requires less computing power and memory to segment. Upsampling is upscaling an image to increase the size of the image, usually from a downsampled size back to an original size.

At 408, probabilities of belonging to the m classes for each pixel of the downsampled image are generated by the initial segmentation method. In method 400 the initial segmentation method includes an initial neural network trained for the task. The initial neural network creates a probability map consisting of the probabilities that each pixel of the image belongs to each of m classes.

Method 400 includes two stages, a coarse segmentation [408] and a patch-based segmentation [410-416]. The coarse segmentation provides global information about the image structure and general location of labels of interest. The coarse segmentation stage is followed by the patch-based segmentation. Method 400 may include additional segmentation steps between the coarse and patch-based segmentation, such as cropping the image and producing intermediate segmentations based on the cropped image, in order to improve probability inputs to the patch-based network.

At 410-416, the image is segmented by a patch-based segmentation method. In the patch-based segmentation, sub-sections of the full resolution image are combined with the coinciding predicted probabilities from the lower-resolution segmentation. The raw pixel data+pixel probabilities are inputted into a final neural network that segments the patches. The final neural network is also trained to segment the image into the m classes, given the inputted pixel+probability data.

At 410, overlapping patches are iteratively extracted from the image along with the coinciding probabilities for each patch derived from the initial coarse segmentation at 408. In this embodiment, the patches are extracted with strides between patches equal to 50% of the patch. However, any stride size may be used.

At 412, each patch is segmented using the full resolution pixel data and the probabilities from the initial neural network as inputs to the final trained neural network. The final neural network has been trained to output probabilities for each of the m classes. Each pixel is classified according to the class it has the highest probability of belonging to.

At 414, the combination of the patches is used to determine the probability that each pixel belongs to each of m classes. That is, if a given pixel is present in more than one patch, the probabilities of the pixel belonging to each of m classes in each of the patches is combined to yield a final probability of the given pixel belonging to each of m classes. The final probability may be an average of the probabilities from each patch or probabilities from each patch may be weighted differently to yield the final probability. This segmentation approach provides the advantage of including full resolution pixel data and providing global context about image structure from the included probability maps.

At 416, the patched-based segmentation is one-hot encoded to yield the final result. One-hot encoding data is a method of labelling data to one of m classes. A one-hot encoded segmentation has one extra dimension when compared to the coinciding image. The additional dimension has a length equal to the number of classes (m). One class is assigned to each level of this dimension. Each pixel from the original image dimensions is associated with a particular level (category) by having a 1 in the coinciding level of the additional dimension, and zeros in all other dimensions. The shape of the one-hot encoded segmentation is the same as the output of the coarse network.

Figure 5:
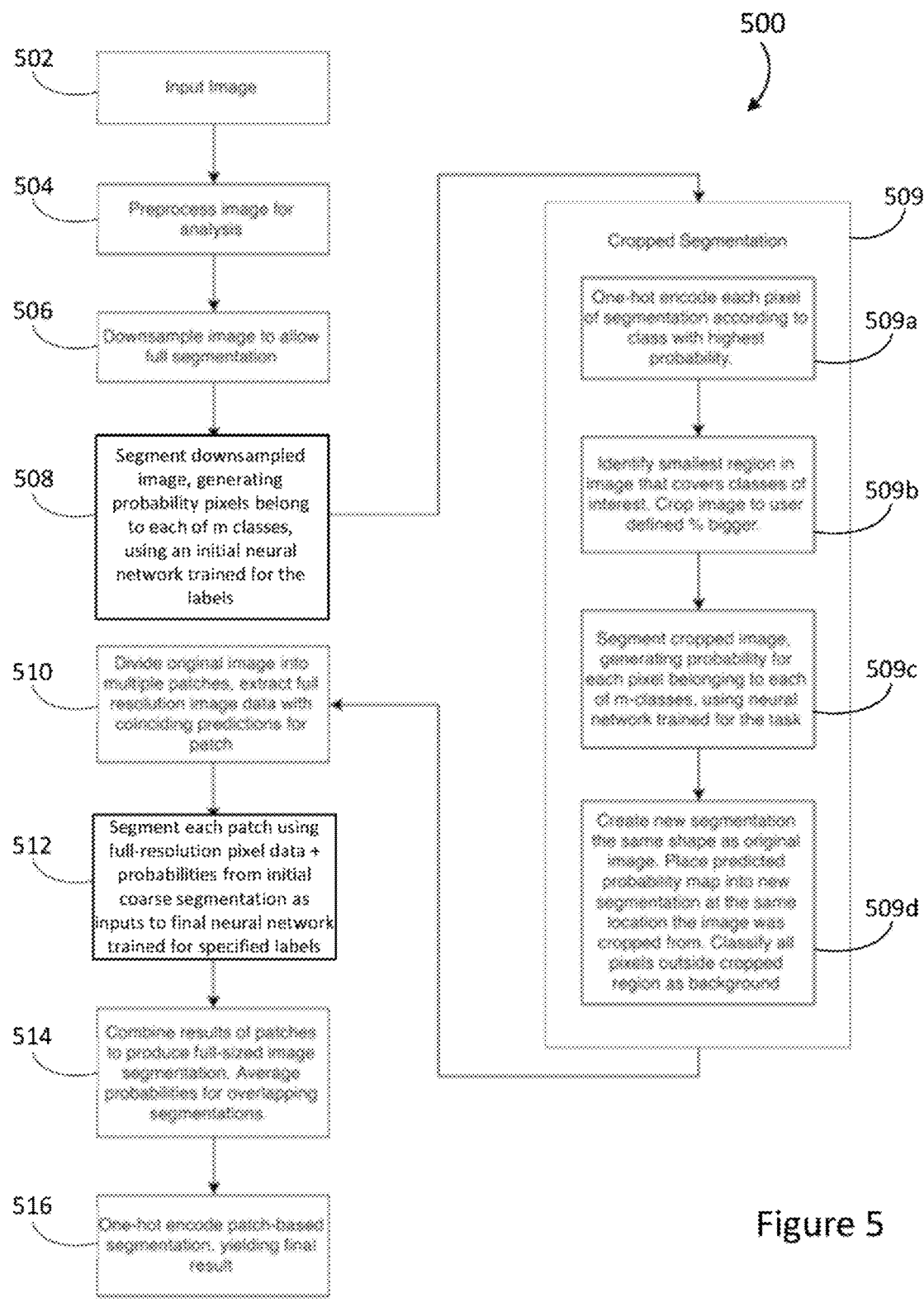
FIG. 5 is a flow chart of a method for automatic image segmentation, in accordance with an embodiment.

Turning now to FIG. 5, illustrated therein is a method 500 of segmenting a full resolution image, in accordance with an embodiment. Method 500 includes a coarse segmentation, a cropped segmentation, and a patch-based segmentation. The coarse segmentation and patch-based segmentation may be similar to the coarse and patch-based segmentations of Method 400. The full resolution image may have n-dimensions, where n is any finite number. Images commonly have n=2, 3, or 4 dimensions, with a photograph being an image where n=2, a medical image such as a computed tomography (CT) or MRI being an image where n=3, and a CT or MRI with a time component being an image where n=4.

509, cropped segmentation, includes 509a, 509, 509c, and 509d. 502, 504, 506, 508, 510, 512, 514, and 516 correspond to 402, 404, 406, 408, 410, 412, 414, and 416 of FIG. 4, respectively.

509a, 509b, 509c, and 509d involve cropping the original image to minimize the area of the original image that is segmented by the final neural network or a "cropped segmentation". This has the added advantage of producing a higher resolution segmentation/label probabilities that is localized to the region of interest before passing these probabilities onto the final neural network for segmentation.

At 509a, each pixel of the segmentation from 508 is one-hot encoded (see FIG. 4 above) according to the m class with the highest probability.

At 509b, the smallest region of the image which covers all classes of interest is identified and the image is cropped to a user defined area. The smallest region of the image is the smallest area by size which contains all pixels that have been identified by the coarse segmentation of 508 as having the highest probability of belonging to one of the m classes. The image may not be cropped to the smallest region and may instead be cropped to an area which is a certain percentage larger than the smallest region. The user may define what percentage larger the cropped area is.

At 509c, the cropped image is again segmented by a trained neural network to generate a probability map. The trained neural network may be the same neural network as 508 or a different one.

At 509d, the probability map from 509c is placed into a new segmentation the same shape as the original image and pixels outside of the cropped region are classified as background.

The method 500 may include image preprocessing [504]. Image preprocessing [504] includes normalization in the form of centering the image pixel intensities to have mean=0 and unit variance $$\left( I_{norm} = \frac{I - \bar{I}}{\sigma_I^2}; I = \text{image}, I_{norm} = \text{normalized image}, \bar{I} = \text{image mean}, \sigma_I^2 = \text{image standard deviation} \right).$$

Other forms of image normalization may be performed such as histogram matching.

Once pre-processed, an initial segmentation is produced using a coarse neural network [508]. The coarse neural network may include an architecture similar to the architecture shown in FIG. 6.

Downsampling [506] may be performed to segment high-resolution images, such as MRI or CT. Downsampling allows management of larger images within hardware constraints. For example, linear interpolation may be used to downsample the image. However, cubic or other interpolation methods may be employed.

Passing the lower resolution image through the coarse network yields a segmentation [508] that is lower resolution than the original image. The lower resolution segmentation must then be upsampled to return to the same size as the input image.

The segmentation of the lower resolution image provides coarse information about the locations of the m classes, however the identification of individual pixels may not be sufficient. That is, the pixel may be mislabeled in the lower resolution image versus in the higher resolution image. In this embodiment, downsampling [506] is achieved by linear interpolation. This results in a segmentation that provides coarse information about the location of the labels of interest, however the identification of individual pixels may not be correct. This global information is often ignored or lost in other implementations of a patch-based segmentation.

To segment images using the coarse network, the network must first be trained on example images. In the example embodiment, the coarse network is trained using a form of gradient descent, for example, an adaptive learning algorithm like the ADAM-optimizer, which employs adaptive moment estimation. In addition, the neural network in the example embodiment includes short residual connections, dropout and batch normalization are included as forms of regularization, and deep-supervision is included in the network architecture. Lastly, in this example, the final network layer is a softmax function $$\sigma(x_j) = \frac{e^{x_j}}{\sum_i e^{x_i}}; x = \text{pixel}, j = j^{th} \text{ class}, i = \text{number of classes})$$

which produces a probability for each pixel belonging to one of m-labels.

The final neural network is trained on a dataset of images that have a coinciding ground truth segmentation. A ground truth segmentation is a segmentation which is as accurate as possible. The ground truth segmentation is likely to be created by a human expert. It is possible that sub optimal ground truth segmentations may be used, however, a larger sample of data is likely needed to produce satisfactory results. The ground truth segmentation is converted to a one-hot encoded format which accommodates m classes.

To train the final neural network, a loss-function or error term is specified. The segmentation produced by the final neural network is compared to the loss function. In this example, the loss function used is the dice-similarity-coefficient $$\left(\text{Dice similarity coefficient} = DSC = \frac{2 \times TP}{2 \times TP + FP + FN};\right.$$
$$\left. TP = \text{true positive}, FP = \text{false positive}, FN = \text{false negative}\right).$$

The final neural network then learns by using gradient descent to determine the optimal weights for each network connection that maximizes the dice similarity coefficient (DSC), or minimizes negative DSC. If multiple-labels are being segmented, a multi-class version of DSC or another accuracy/error term may be used such as categorical cross-entropy. The described embodiments are not dependent on any one loss function, and alternatives may be used. During training, input images are augmented using random rotations, translations, and shear.

To improve the probabilities for each pixel inputted into the patch-based network, the coarse segmentation [508] may be refined further [509]. The user may choose to refine the segmentation, as in FIG. 5, or continue straight to the patch-based segmentation as in FIG. 4. The choice may be determined based on 1) the size of the original image and the amount of downsampling required, 2) the specific shapes of the structure being labelled, and 3) a trade-off between speed and accuracy.

In this embodiment, the segmentation produced by the coarse network is used to crop the original image [509], identifying the smallest region that includes the label(s) of interest [509b] as classified by the coarse segmentation from 508. In this embodiment the cropped region is 20% larger than the smallest region which contains the m class labelled pixels, but in another embodiment the cropped region could be more or less than 20% larger than the smallest region. A section larger than just the m class pixels is recommended because it will provide some additional context to the image and will also allow some buffer if the coarse segmentation does not identify the entire structure of interest.

The cropped segmentation is then downsampled using the same method described in the coarse segmentation. Again, downsampling is done to ensure the image and coinciding neural network fit into hardware memory. However, if the cropped section is small enough downsampling may not be necessary. After downsampling, the cropped and downsampled image is segmented by the "cropped network" [509c]. In this embodiment the cropped network takes the same form as the coarse network (FIG. 6), including output function, training optimizer, and error/loss function.

The output of the cropped segmentation is a set of probabilities that each pixel belongs to one of the m classes. The cropped segmentation is upsampled to match the original resolution of the cropped image region, using interpolation. The cropped section is then placed into a new segmentation that is the same shape as the original image [509d]. The cropped segmentation is placed into the new segmentation at the same location it was extracted from the original image [509d]. All pixels outside of the cropped region are labelled according to the class associated with background.

Finally, in this example (FIG. 5), the probabilities from the cropped segmentation are concatenated with the raw image data. However, as shown in FIG. 4 it is possible that other embodiments may concatenate the probabilities from the coarse segmentation with the raw image data. It is also possible that other segmentation steps may be included before concatenating the raw pixel data and probabilities. Other methods could include replacing, adding too, or expanding on the "cropped segmentation" section. At 510, subregions of the full resolution image, including the raw pixel values and the probabilities are extracted and inputted into a patch-based final neural network.

In this embodiment, the patch-based final neural network ("patch network") also takes the form of a convolutional autoencoder (FIG. 7) and includes batch normalization, dropout, short residual connections, softmax as the output function, and used DSC as the loss function. To train the patch network, individual patches of the concatenated raw pixel data and the coinciding probabilities of the pixel belonging to each of the m classes are extracted from example images and inputted into the patch network. The softmax at the final layer outputs the probability that each pixel belongs to one of the m classes. This network is again trained using the ADAM optimizer. In this example the raw pixel data are concatenated with probabilities from a single previous segmentation and inputted into the final neural network.

Another potential embodiment is that the raw pixel data are concatenated with multiple predictions produced by multiple networks used to segment the image. If multiple predictions are used, it would be likely that these predictions are produced using other network architectures or other hyper-parameters to provide different "perspectives". Combining probabilities from multiple networks with different parameters, the patch-based segmentation will likely be more robust to errors from any individual network. Again, a decision on how many prediction inputs to include is likely determined based on the trade-off between accuracy and speed.

To apply the patch-based segmentation, in this example, a region 40% larger than the region that contains the label(s) of interest is extracted. The extracted region is then broken into overlapping patches that are the size of the patch network. Each of the patches is then segmented using the patch network with inputs of raw pixel data+the probability(ies) that the pixel belongs to each of the m classes. For this embodiment, the predictions produced for each pixel from all the overlapping patches are averaged to determine the probabilities that each pixel belongs to each of the m classes. It is possible to use some other method to combine the overlapping segmentations, such as taking the median or applying another softmax function. In this example, the final binary one-hot encoded segmentation is determined by classifying each pixel according to the label it has the highest probability of belonging to. The resulting patch-based segmentation is then placed back in a full-sized segmentation, at the same location where it was extracted from in the original image. All pixels outside of the region segmented by the patch-network are classified as background.

In this example, it was highlighted that multiple predictions may be inputted into the patch-based final neural network. It is also possible that multiple predictions may be created at the coarse segmentation stage. These predictions could be averaged to produce more consistent cropping.

The proposed segmentation method utilized a patch-based final neural network segmentation algorithm with inputs of global information about the structure of the image, provided by the cropped segmentation probabilities, and full resolution image data. This combination of information allows us to overcome the shortcoming of other proposed neural network segmentation approaches that require downsampling, or lose global image context by using patches without global context.

Figure 6:
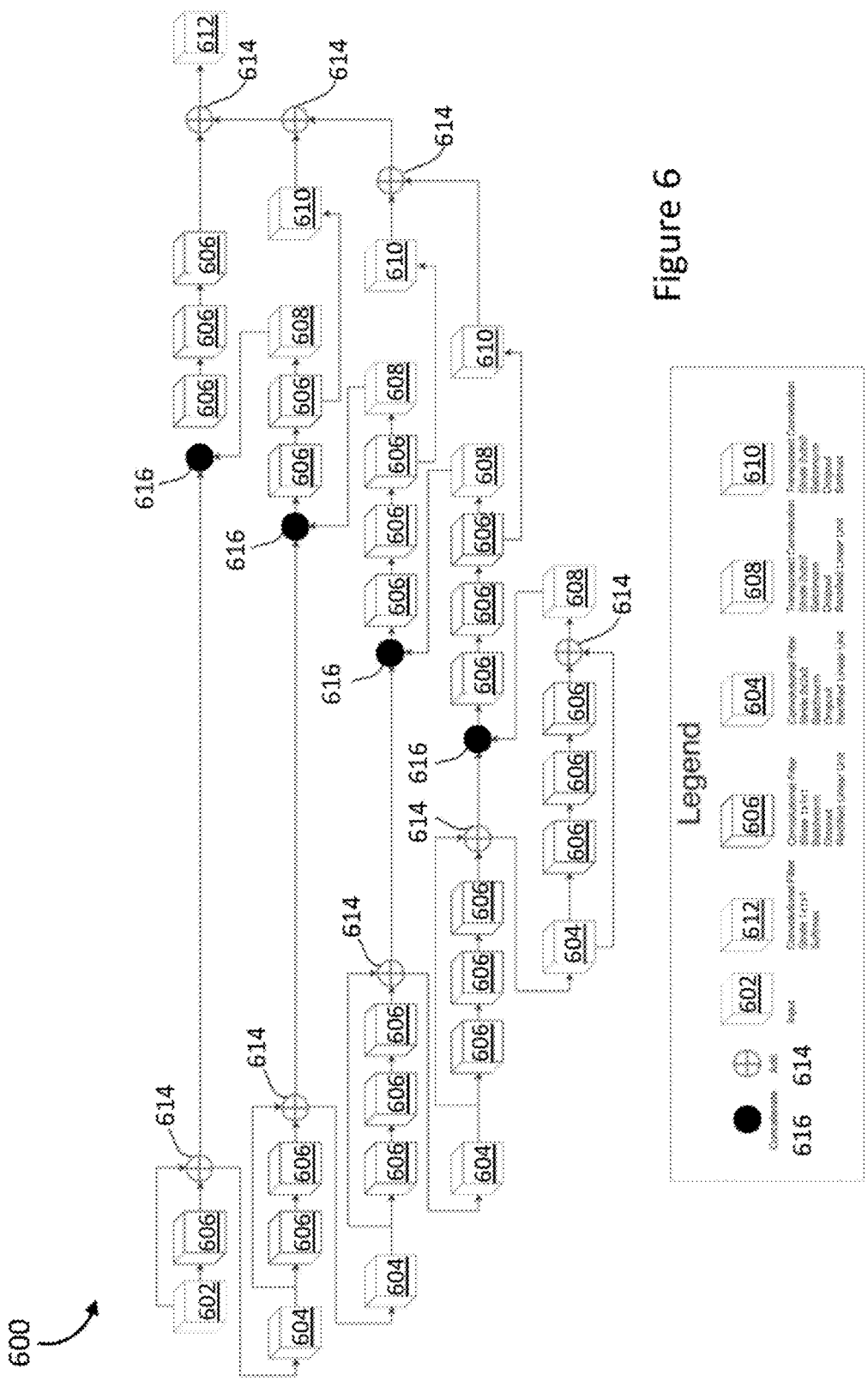
FIG. 6 is a block diagram of an initial neural network, in accordance with an embodiment.

FIG. 6 shows a box diagram of an example of an initial neural network architecture that could be employed to segment medical images. The network shown includes an input image (volume 602) which passes through convolutional filters (volume 606), downsampling convolutional filters (volume 604), upsampling or transposed convolution filters (volume 608), has softmax supervision filters (volume 610), and includes short and long connections which are created via summation (+ symbol 614) and concatenation (black circle 616), and softmax is used for the outputted segmentation activation (volume 612). Stride 1×1×1, stride 2×2×2, batchnorm, dropout, rectified linear unit, and softmax are all different methods, techniques, or parameters used in a convolutional filter.

The network in FIG. 6 can be derived using commercial, open-source, or custom code to generate the network connections or graph. In this embodiment, the Keras deep learning library and the Tensorflow backend are employed, but other software packages are available or may be custom written. Once this network is generated, the connections (weights) between nodes in the network are learned using an optimizer and a loss function. During "learning", the connections (weights) between the network nodes are iteratively updated using backpropagation of an error term via the optimizer of choice (ADAM in this example) along with appropriate training data (labeled images). The error (loss) is calculated for each iteration by comparing the outputted segmentation from the network to the labeled image used for training. In this example the DSC loss function is used. To produce the outputted segmentation, in the final block of this network embodiment (612), a softmax function is applied. This softmax function produces probabilities that each pixel belongs to one of the m-classes. During learning, the produced segmentation is compared to the coinciding labeled image using the loss function of choice (DSC).

Once training of the network in FIG. 6 has converged, as typically assessed using testing on a validation or hold-out dataset, the network itself and its learned weights can be used to segment new images. That is, an image that is pre-processed in the same method that was used for training will be inputted into the network at 602 and this image will subsequently flow through the network graph/connections. As the image flows through, the convolutions will be applied to branches of the network as described in blocks 612, 606, 604, 608, and 610. The output of these convolutions is passed on to the next stage of the network, which may be another convolution or some other operation to the image/data like addition or concatenation with another branch or part of the network/graph. Again, the final stage of the graph is the softmax function that will produce probabilities that each pixel belongs to the m-classes.

As was described above, the network displayed here uses the U-Net style architecture. This network has been updated from the original U-Net architecture to analyze 3D data, it uses short as well as long residual connections, it has batch-normalization, utilizes rectified linear units, and has dropout.

Figure 7:
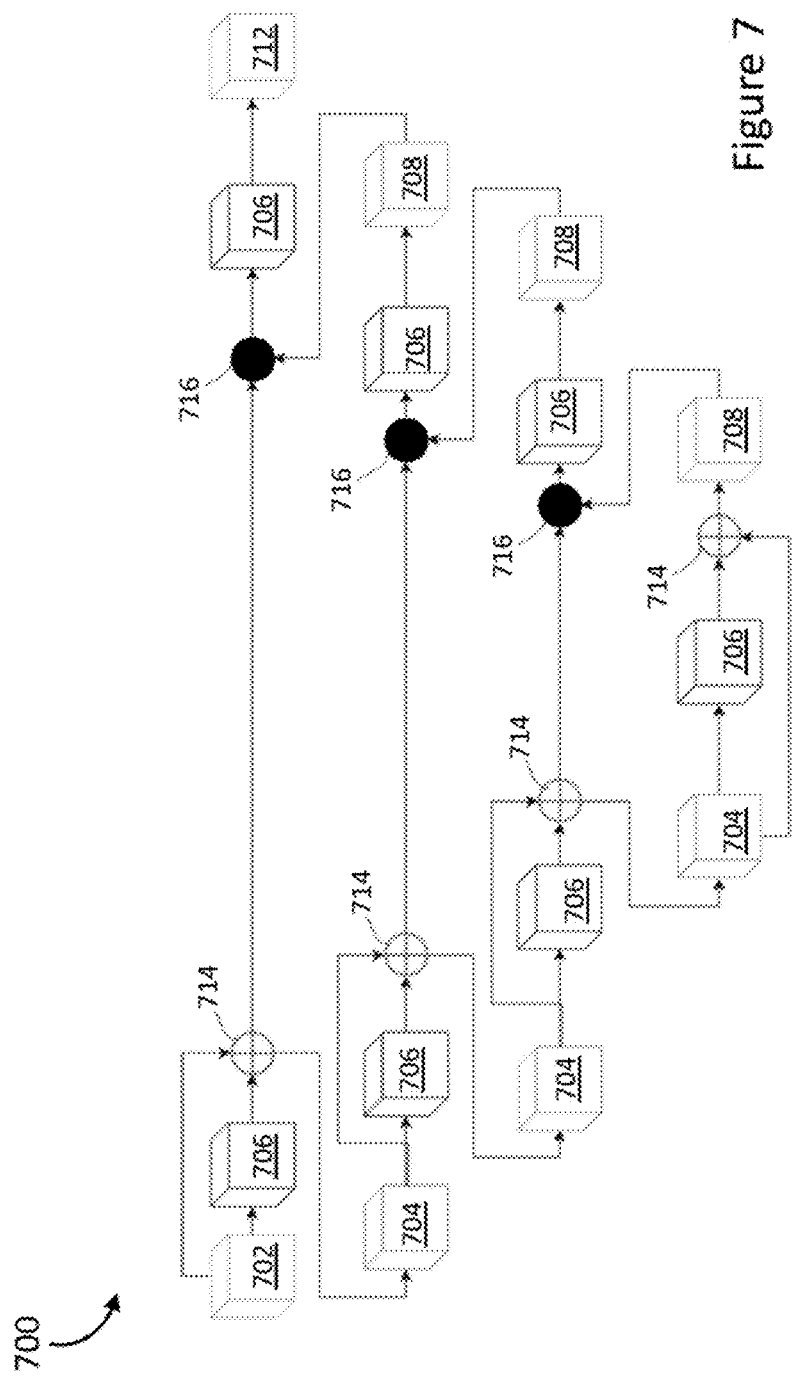
FIG. 7 is a block diagram of a final neural network, in accordance with an embodiment.
Figure 7:
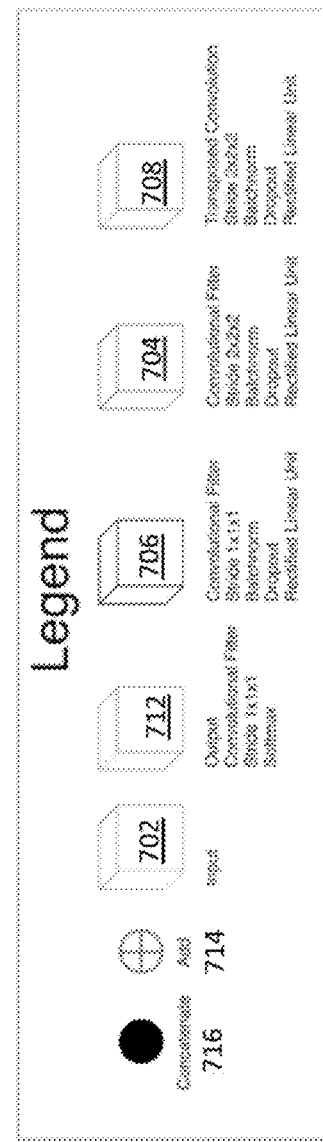

FIG. 7 shows a box diagram of an example of a final neural network architecture that could be employed to segment medical images. The network shown includes an input image (volume 702) which passes through convolutional filters (volume 706), downsampling convolutional filters (volume 704), upsampling or transposed convolution filters (volume 708), and includes short and long connections which are created via summation (+ symbol 714) and concatenation (black circle 716), and softmax is used for the outputted segmentation activation (volume 712). Stride 1×1×1, stride 2×2×2, batchnorm, dropout, rectified linear unit, and softmax are all different methods, techniques, or parameters used in a convolutional filter.

As with the initial neural network of FIG. 6, once training of the final neural network in FIG. 7 has converged, as typically assessed using testing on a validation or hold-out dataset, the network itself and its learned weights can be used to segment new images. That is, an image that is pre-processed in the same method that was used for training will be inputted into the network at 702 as well as the probabilities of each pixel belonging to m classes as output by the initial segmentation method. The probabilities will be in the form of one or more probability maps depending on the method of deriving probabilities of the initial segmentation method. The data (image and probabilities) will subsequently flow through the network graph/connections. As the data flows through, the convolutions will be applied to branches of the network as described in blocks 712, 706, 704, 708, and 710. The output of these convolutions is passed on to the next stage of the network, which may be another convolution or some other operation to the image/data like addition or concatenation with another branch or part of the network/graph. The final stage of the graph is the softmax function that will produce probabilities that each pixel belongs to the m-classes.

FIGS. 8A, 8B, 8C, 8D, 8E, 8F, 8G, and 8H are all examples of segmented knee MRI images. Bones which comprise the knee are the femur 801, the tibia 802, and the patella 803. FIGS. 8A-8H all include femur 801 and tibia 802 but only FIGS. 8B-8F include patella 803. Femur 801, tibia 802, and patella 803 have been labelled inside of the boundaries of the bone for clarity. Knee MRI images 810a, 820a, 830a, 840a, 850a, 860a, 870a, and 880a are the original images which have not been segmented by the methods described herein. Knee MRI images 810b, 820b, 830b, 840b, 850b, 860b 870b, and 880b have been segmented by the methods described herein. The images have been segmented to classify certain areas of the image as femoral cartilage, lateral tibial cartilage, medial tibial cartilage, and patellar cartilage. Femoral cartilage is represented by blue pixels, lateral tibial cartilage is represented by green pixels, medial tibial cartilage is represented by orange pixels, and patellar cartilage is represented by red pixels.

Figure 8A:
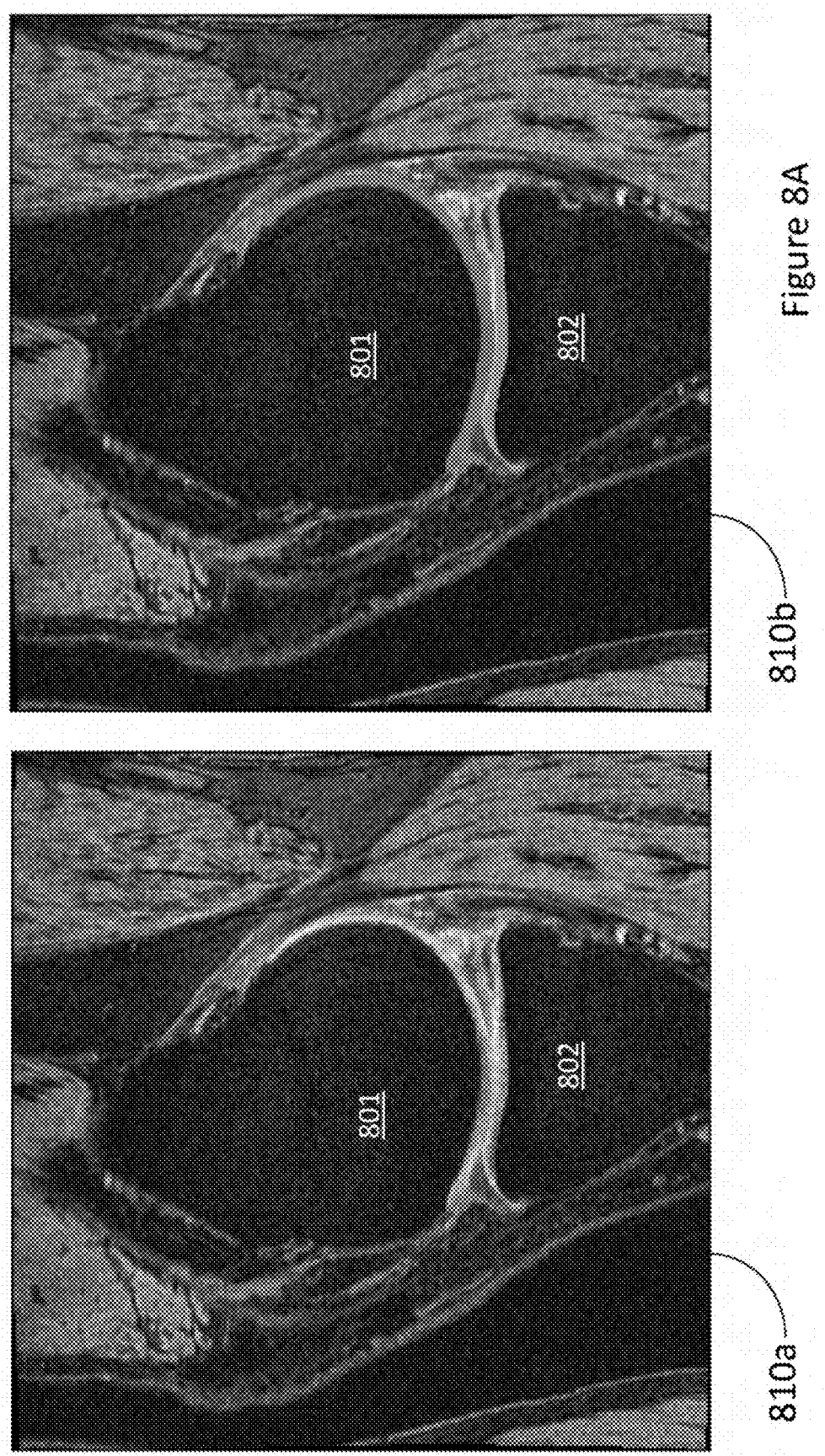
FIG. 8A is an image of a segmented knee magnetic resonance imaging (MRI) image, in accordance with an embodiment.
Figure 8B:
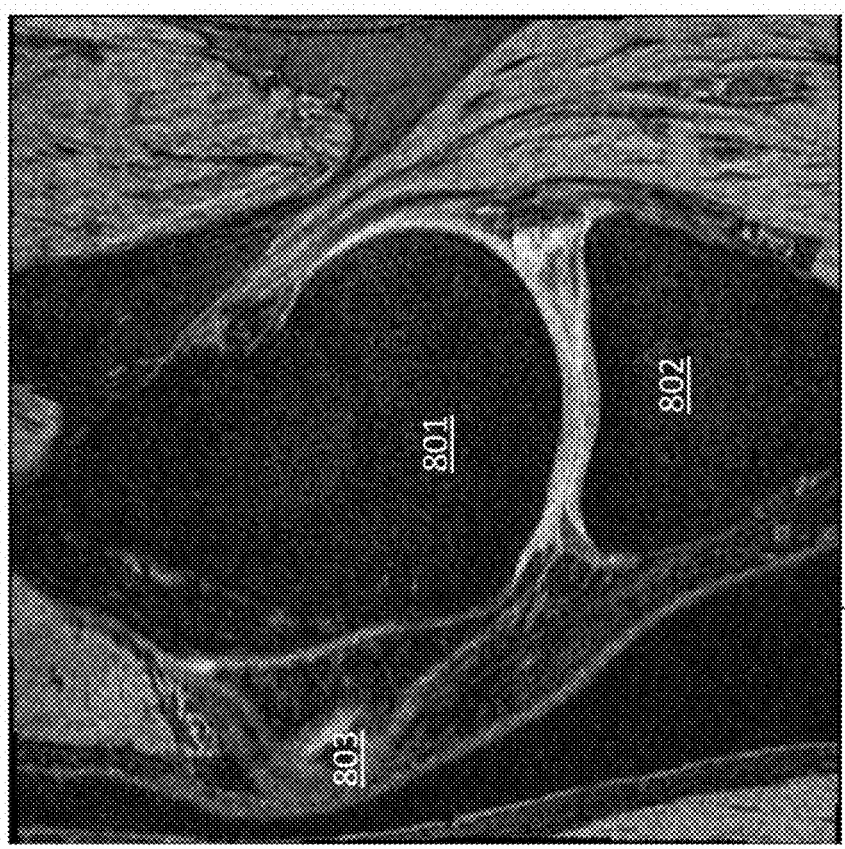
FIG. 8B is an image of a segmented knee MRI image, in accordance with an embodiment
Figure 8B:
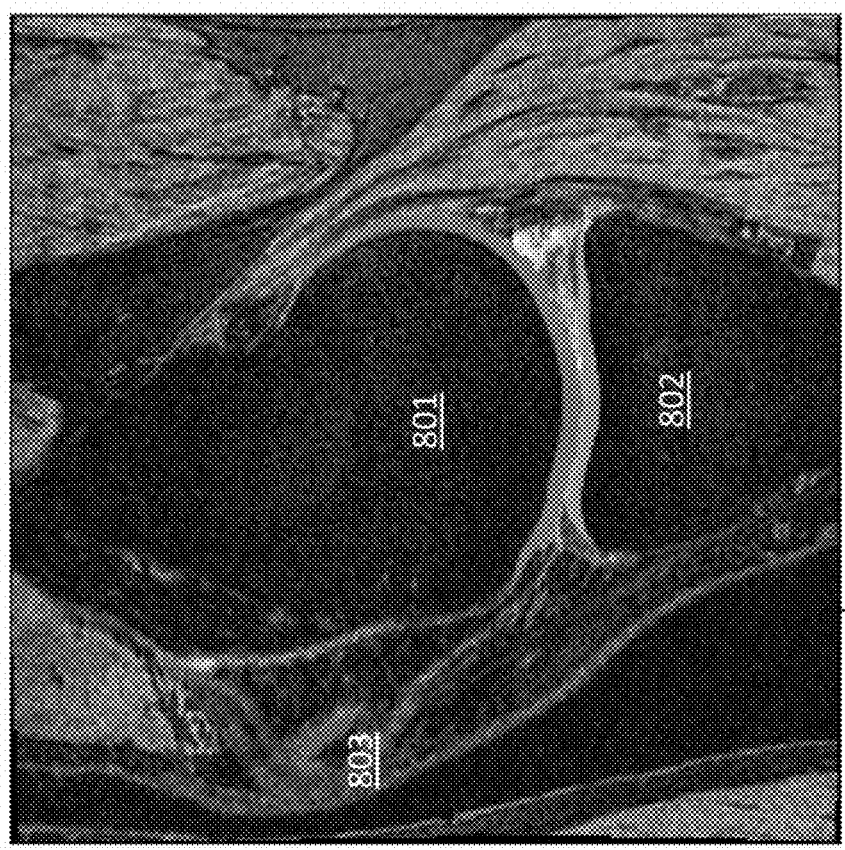
Figure 8C:
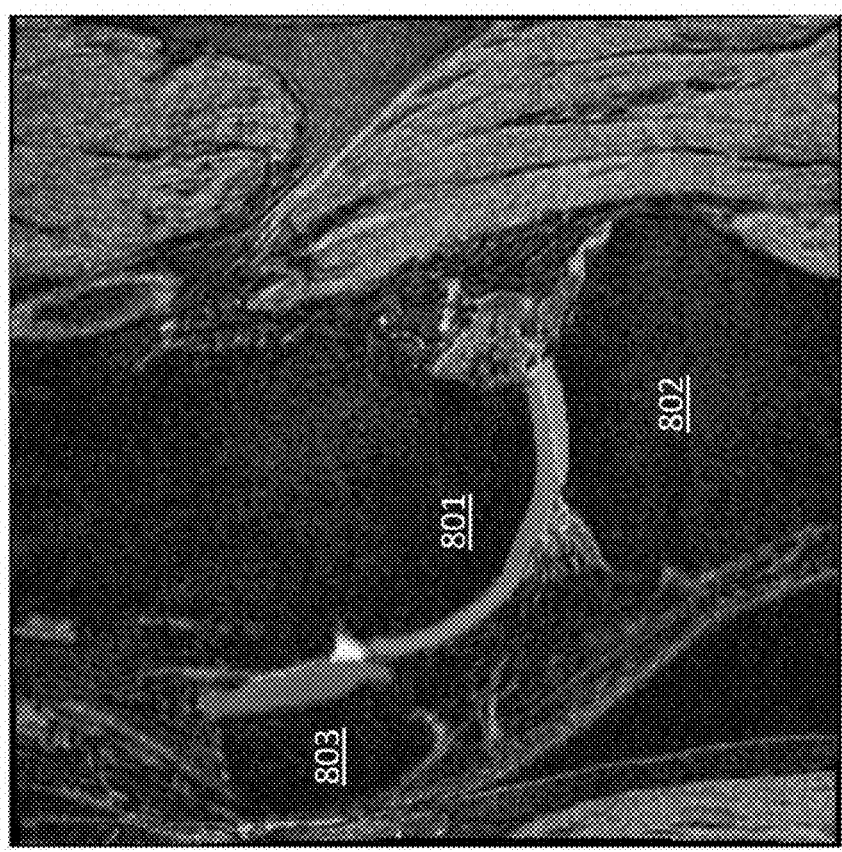
FIG. 8C is an image of a segmented knee MRI image, in accordance with an embodiment.
Figure 8C:
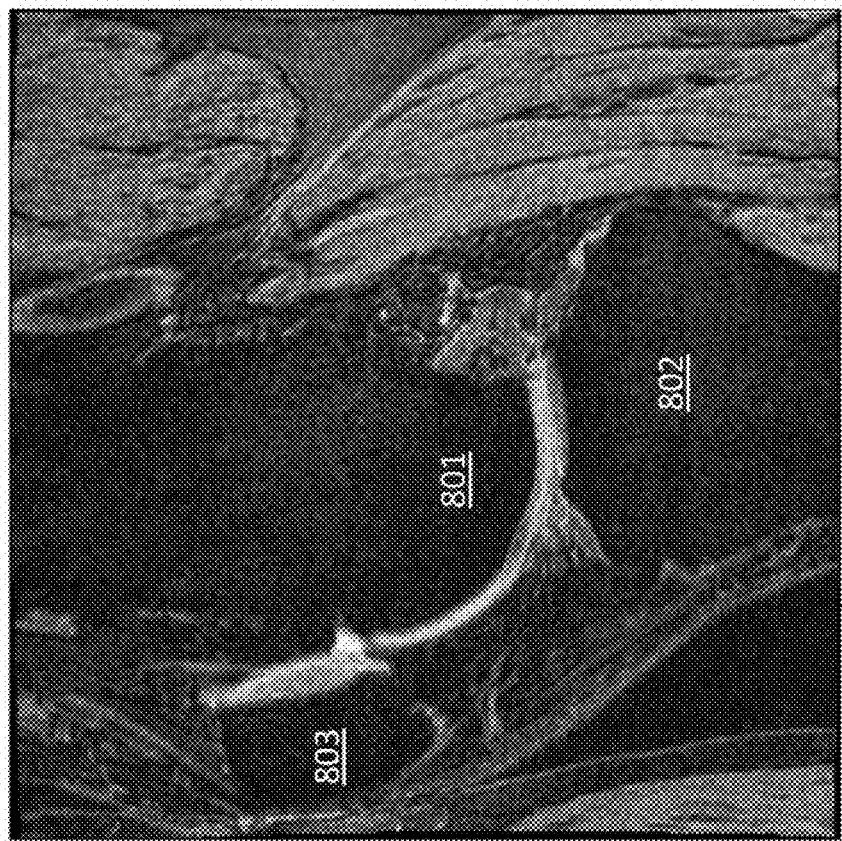
Figure 8D:
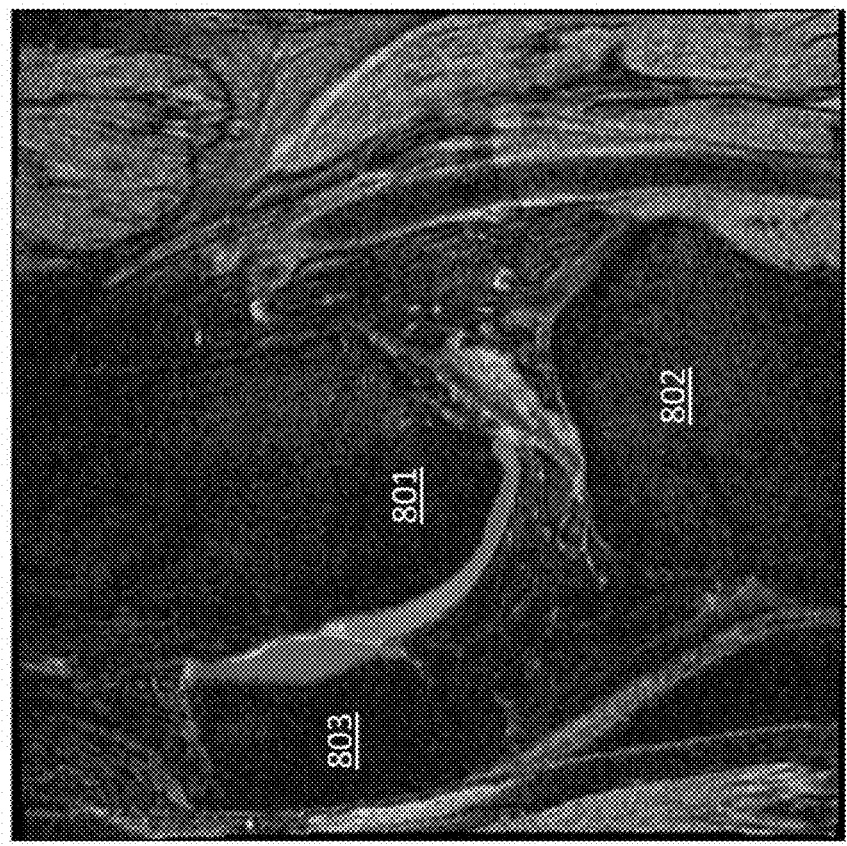
FIG. 8D is an image of a segmented knee MRI image, in accordance with an embodiment.
Figure 8D:
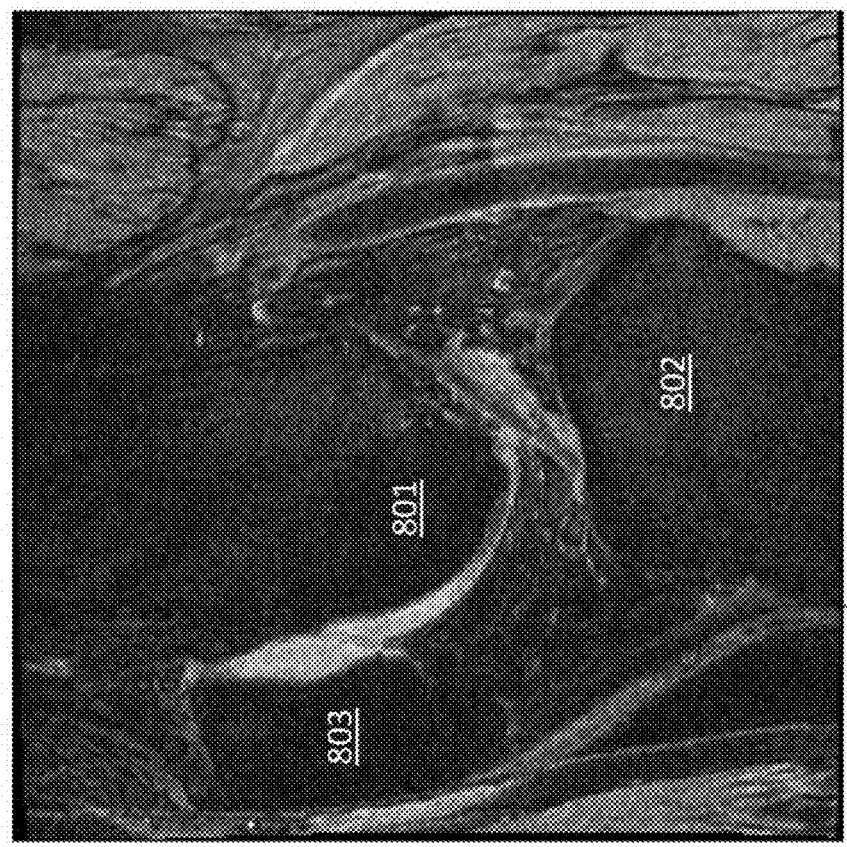
Figure 8E:
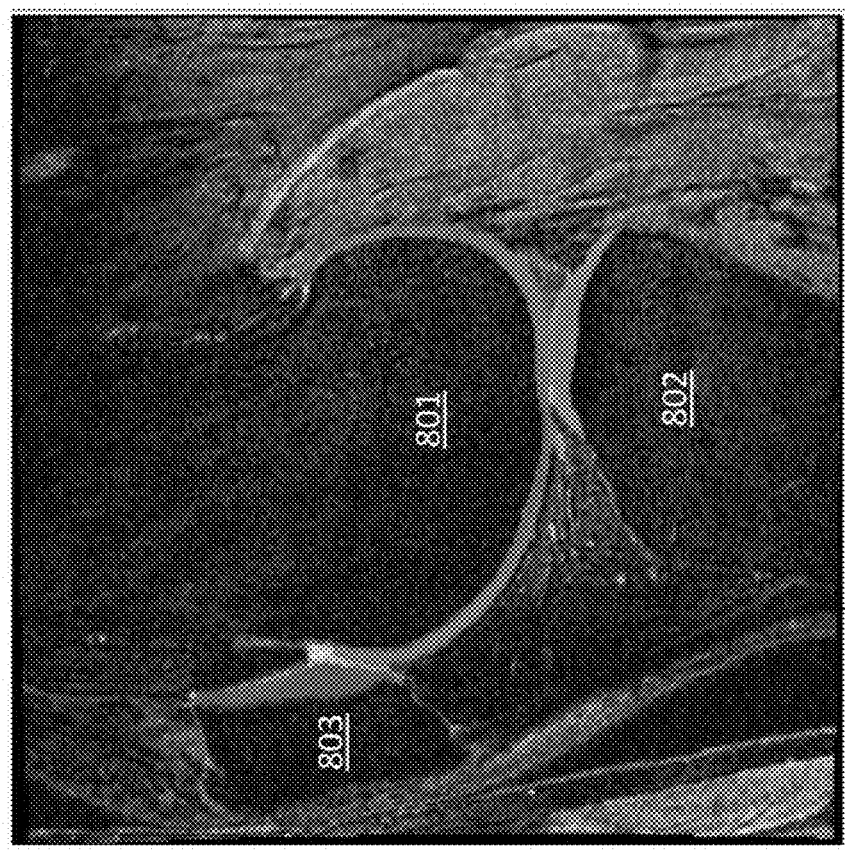
FIG. 8E is an image of a segmented knee MRI image, in accordance with an embodiment.
Figure 8E:
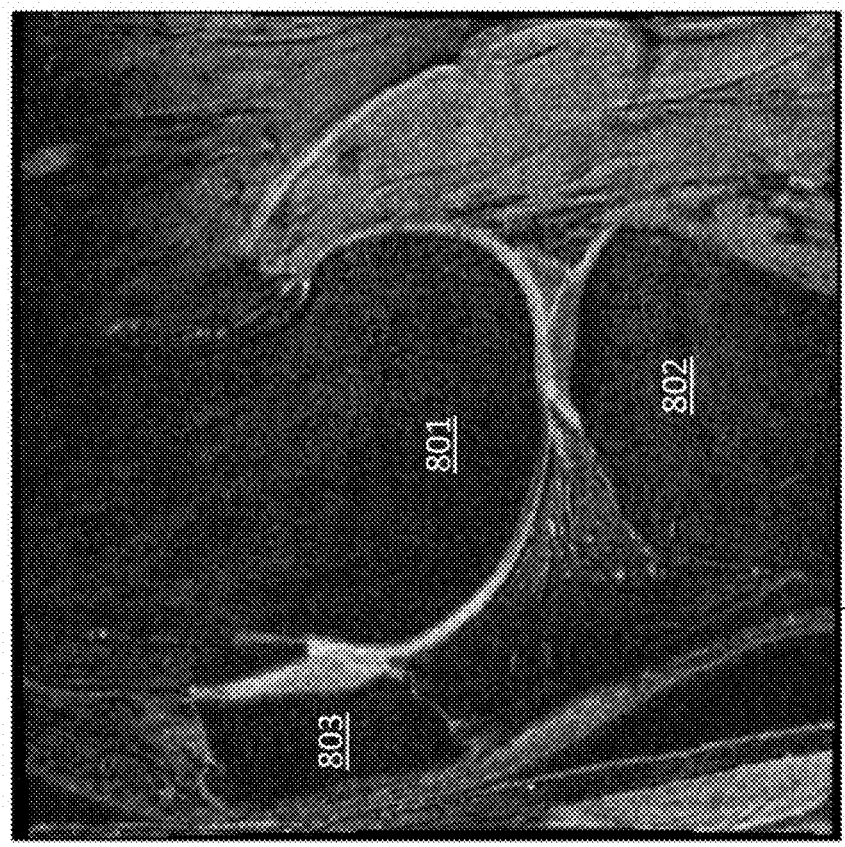
Figure 8G:
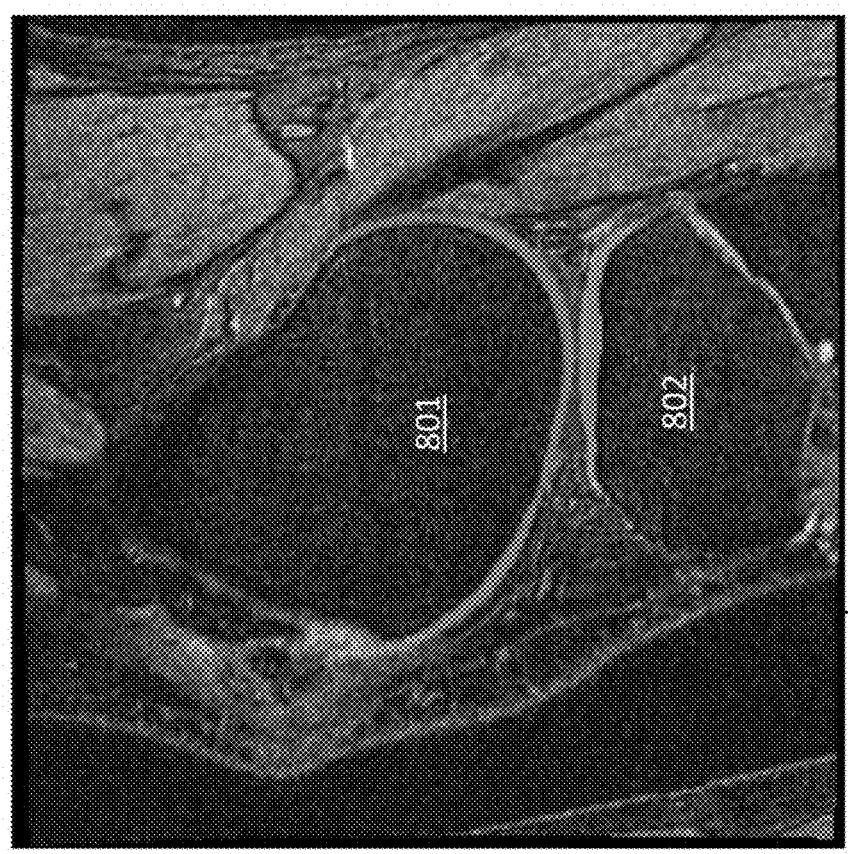
FIG. 8G is an image of a segmented knee MRI image, in accordance with an embodiment.
Figure 8G:
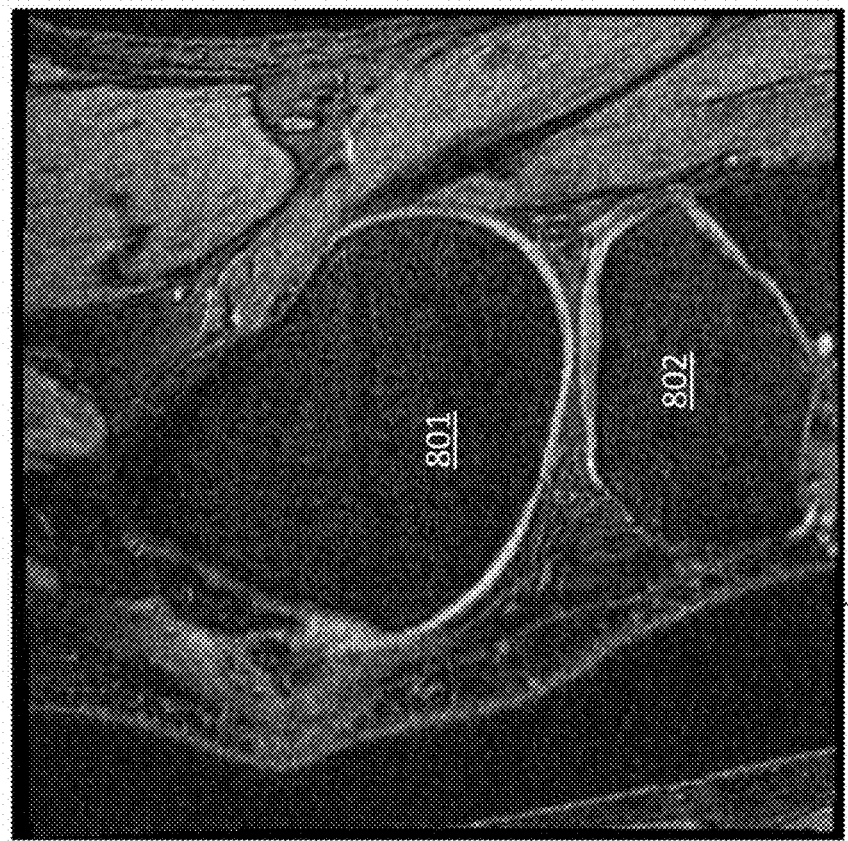
Figure 8H:
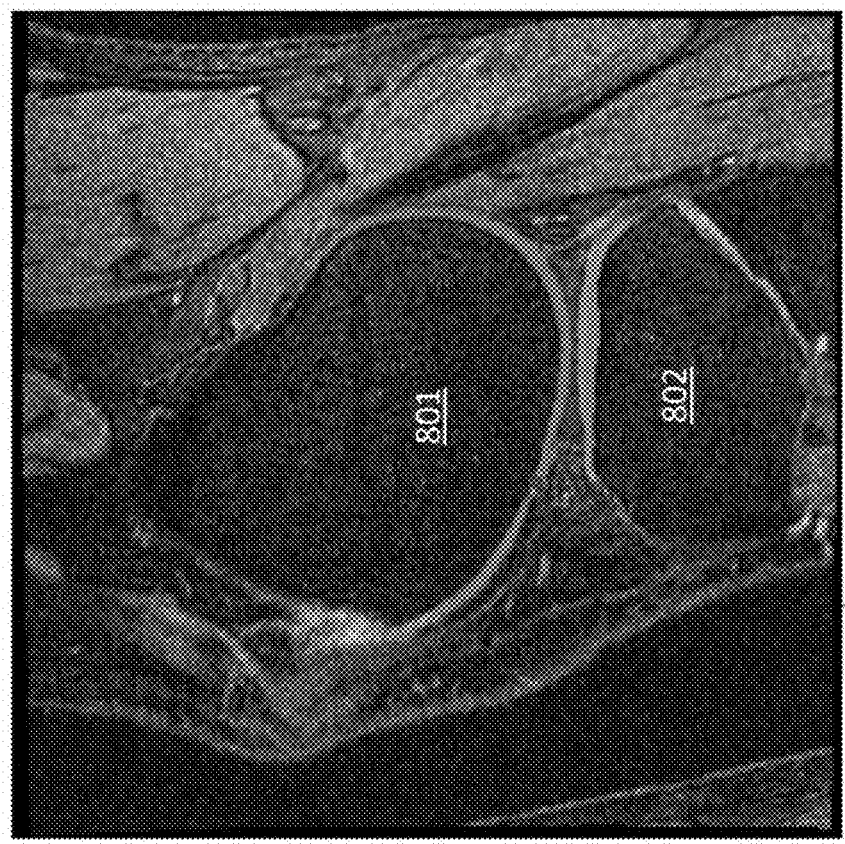
FIG. 8H is an image of a segmented knee MRI image, in accordance with an embodiment.
Figure 8H:
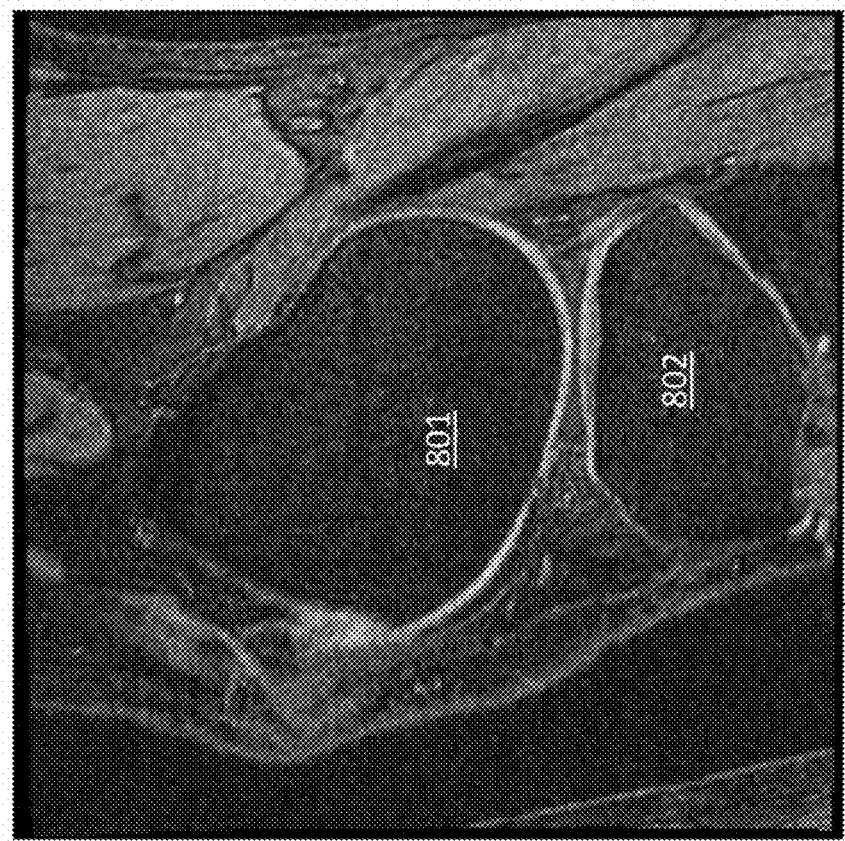

Image 810a of FIG. 8A has been segmented by the methods described herein and been found to include femoral cartilage (blue) and medial tibial cartilage (orange) as shown in image 810b. Image 820a of FIG. 8B has been segmented by the methods described herein and been found to include femoral cartilage (blue), medial tibial cartilage (orange), and patellar cartilage (red) as shown in image 820b. Image 830a of FIG. 8C has been segmented by the methods described herein and been found to include femoral cartilage (blue), medial tibial cartilage (orange), and patellar cartilage (red) as shown in image 830b. Image 840a of FIG. 8D has been segmented by the methods described herein and been found to include femoral cartilage (blue) and patellar cartilage (red) as shown in image 840b. Image 850a of FIG. 8E has been segmented by the methods described herein and been found to include femoral cartilage (blue), patellar cartilage (red), and lateral tibial cartilage (green) as shown in image 850b. Image 860a of FIG. 8F has been segmented by the methods described herein and been found to include femoral cartilage (blue), patellar cartilage (red), and lateral tibial cartilage (green) as shown in image 860b. Image 870a of FIG. 8G has been segmented by the methods described herein and been found to include femoral cartilage (blue) and lateral tibial cartilage (green) as shown in image 870b. Image 880a of FIG. 8H has been segmented by the methods described herein and been found to include femoral cartilage (blue) and lateral tibial cartilage (green) as shown in image 880b.

The described methods are examples and may include various methods of obtaining probabilities that each pixel in an image belongs to each of m classes of interest, and then inputting those probabilities along with the original image data into a final neural network trained to segment the classes of interest using the provided inputs. The breadth of the invention is not limited to the described embodiments and various modifications may be implemented by those with experience in the field. For example, the specifics of whether or when normalization is performed, whether or when an image is downsampled, whether or when cropping is used, and if a patch-based segmentation should be employed.

While the above description provides examples of one or more apparatus, methods, or systems, it will be appreciated that other apparatus, methods, or systems may be within the scope of the claims as interpreted by one of skill in the art.

The invention claimed is:

1. A computer system for segmenting a medical image, the system comprising:
at least one processor and a memory having stored thereon instructions that, upon execution, cause the system to perform functions comprising:
inputting the medical image into a plurality of segmentation methods;
deriving a plurality of sets of probabilities belonging to at least one tissue class for each pixel of the medical image using the plurality of segmentation methods;
inputting the medical image into a final neural network;
inputting the plurality of sets of probabilities into the final neural network; and
segmenting the medical image into the at least one tissue class based on the medical image and the plurality of sets of probabilities by the final neural network.

2. The system of claim 1, wherein the plurality of segmentation methods includes any one or more of: an initial neural network, a machine learning classifier, or an atlas-based segmentation algorithm.

3. The system of claim 1, wherein the medical image is input into at least one of the plurality of segmentation methods and the final neural network as sub-sections of the medical image, the method further comprising:
deriving at least one set of probabilities for each sub-section of the medical image; and
combining the probabilities from the sub-sections.

4. The system of claim 1, wherein the functions further comprise pre-processing the medical image.

5. The system of claim 1, wherein at least one of the plurality of sets of probabilities is derived from a lower resolution iteration of the medical image.

6. The system of claim 1, wherein at least one of the plurality of sets of probabilities is derived from at least two iterations of the medical image.

7. The system of claim 1, wherein the medical image is any one of: a magnetic resonance imaging image, a computed tomography image, an ultrasound image, an x-ray image, or a positron emission tomography image.

8. A method of segmenting an image, the method comprising:
deriving a plurality of sets of probabilities belonging to m classes, where m is any positive integer, for each pixel of an image using a plurality of segmentation methods;
inputting the image into a final neural network;
inputting the plurality of sets of probabilities into the final neural network; and
segmenting the image into the m classes based on the image and the plurality of sets of probabilities by the final neural network.

9. The method of claim 8, wherein the plurality of segmentation methods includes any one or more of: an initial neural network, a machine learning classifier, or an atlas-based segmentation algorithm.

10. The method of claim 8, wherein the image is input into at least one of the plurality of segmentation methods and the final neural network as sub-sections of the image, the method further comprising:
deriving at least one set of probabilities for each sub-section of the image; and
combining the probabilities from the sub-sections.

11. The method of claim 8, wherein the functions further comprise pre-processing the image.

12. The method of claim 8, wherein at least one of the plurality of sets of probabilities is derived from a lower resolution iteration of the image.

13. The method of claim 8, wherein at least one of the plurality of sets of probabilities is derived from at least two iterations of the image.

14. The method of claim 8, wherein the image is any one of: a magnetic resonance imaging image, a computed tomography image, an ultrasound image, an x-ray image, or a positron emission tomography image.

15. A system for segmenting an image, the system comprising:
at least one processor and a memory having stored thereon instructions that, upon execution, cause the system to perform function comprising:
deriving a plurality of sets of probabilities belonging to m classes where m is any positive integer, for each pixel of an image using a plurality of segmentation methods;
inputting the image into a final neural network;
inputting the plurality of sets of probabilities into the final neural network; and
segmenting the image into the m classes based on the image and the plurality of sets of probabilities by the final neural network.

16. The system of claim 15, wherein the plurality of segmentation methods includes at least one method selected from the group consisting of: an initial neural network, a machine learning classifier, or an atlas-based segmentation algorithm.

17. The system of claim 15, wherein the image is input into at least one of the plurality of segmentation methods and the final neural network as sub-sections of the image, the method further comprising:
 deriving at least one set of probabilities for each sub-section of the image; and
 combining the probabilities from the sub-sections.

18. The system of claim 15, wherein the functions further comprise pre-processing the image.

19. The system of claim 15, wherein at least one of the plurality of sets of probabilities is derived from a lower resolution iteration of the image.

20. The system of claim 15, wherein at least one of the plurality of sets of probabilities is derived from at least two iterations of the image.

* * * * *